US010059595B1

(12) United States Patent
Farbstein

(10) Patent No.: US 10,059,595 B1
(45) Date of Patent: Aug. 28, 2018

(54) ULTRA HIGH STRENGTH NANOMATERIALS AND METHODS OF MANUFACTURE

(71) Applicant: Neil Farbstein, Syosset, NY (US)

(72) Inventor: Neil Farbstein, Syosset, NY (US)

(73) Assignee: Neil Farbstein, Syosset, NY (US)

( * ) Notice: Subject to any disclaimer, the term of this patent is extended or adjusted under 35 U.S.C. 154(b) by 511 days.

(21) Appl. No.: 14/488,452

(22) Filed: Sep. 17, 2014

(51) Int. Cl.
    *H01B 1/04* (2006.01)
    *C01B 31/36* (2006.01)
    (Continued)

(52) U.S. Cl.
    CPC ............. *C01B 31/36* (2013.01); *B05D 1/02* (2013.01); *B29C 43/003* (2013.01);
    (Continued)

(58) Field of Classification Search
    CPC .......... C01B 31/36; C25D 13/00; C25D 5/54; B29C 43/006; B29C 43/003; C09D 1/00;
    (Continued)

(56) References Cited

U.S. PATENT DOCUMENTS

| 6,783,745 B1 * | 8/2004 | Voronov | ............... | B82Y 30/00 |
| | | | | 423/445 B |
| 7,612,006 B2 * | 11/2009 | Komeya | ............... | B82Y 30/00 |
| | | | | 252/506 |

(Continued)

FOREIGN PATENT DOCUMENTS

| WO | 2013119295 A9 | 8/2013 |
| WO | 2014004514 A1 | 1/2014 |

OTHER PUBLICATIONS

Zhu et.al. "A seamless three-dimensional carbon nanotube graphene hybrid material" Nature Communications Nov. 27, 2012 vol. 3 article No. 1225 DOI: 115.1638/ncomms2234 Macmillan Publishers Limited NY,NY USA.
(Continued)

*Primary Examiner* — Mark Kopec
*Assistant Examiner* — Jaison P Thomas

(57) ABSTRACT

A general method of manufacturing high strength ultrafine grained nanostructured carbon and carbide materials that combines densification of nanoparticles with heat treatments or other means of supplying energy to cause fusion of structures that interlink and weld the nanoparticles together. Coatings films, nanopaper, nanopaper laminates, fibers, and extended objects can be manufactured by applying the disclosed methods. The nanomaterials are useful for additive manufacturing of rapid prototyped objects. A variety of nanoparticle starting materials are divulged including but not limited to double walled carbon nanotubes, fluorinated graphene nanosheets, silicon nanowires, and boron nanoplatelets. Articles can be manufactured with spark plasma synthesis, capacitive discharge sintering, hot press apparatus and green bodies can be processed in furnaces. The nanomaterials and ultra high strength articles manufactured from them will have applications including laparoscopic instruments, structural composites, heat sinks, EMI shielding, ballistic protection and aerospace components.

19 Claims, 13 Drawing Sheets

Figure 1:
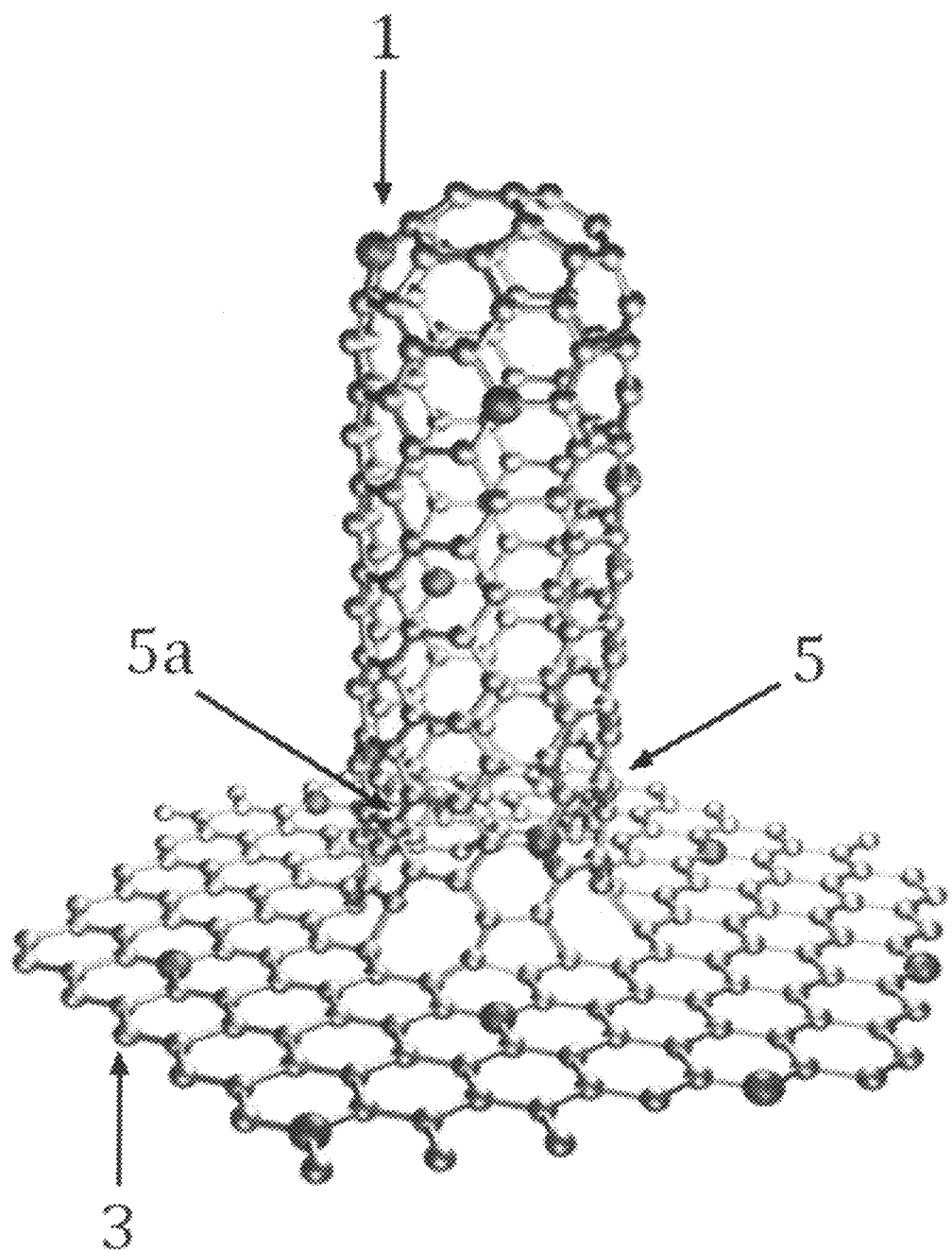

(51) Int. Cl.
| | |
|---|---|
| *B05D 1/02* | (2006.01) |
| *B29C 43/00* | (2006.01) |
| *C09D 1/00* | (2006.01) |
| *C25D 5/54* | (2006.01) |
| *C25D 13/00* | (2006.01) |
| *B29L 31/00* | (2006.01) |
| *B82Y 30/00* | (2011.01) |
| *B82Y 40/00* | (2011.01) |

(52) U.S. Cl.
CPC ............ *B29C 43/006* (2013.01); *C09D 1/00* (2013.01); *C25D 5/54* (2013.01); *C25D 13/00* (2013.01); *B29L 2031/00* (2013.01); *B82Y 30/00* (2013.01); *B82Y 40/00* (2013.01); *Y10S 977/734* (2013.01); *Y10S 977/75* (2013.01); *Y10S 977/752* (2013.01)

(58) Field of Classification Search
CPC ... B05D 1/02; B29L 2031/00; Y10S 977/752; Y10S 977/75; Y10S 977/734; B82Y 30/00; B82Y 40/00; H01B 1/04
See application file for complete search history.

(56) References Cited

U.S. PATENT DOCUMENTS

| | | | |
|---|---|---|---|
| 7,862,766 B2 | 1/2011 | Liang | |
| 8,602,133 B2 | 12/2013 | Dennis | |
| 8,758,717 B2 | 6/2014 | Ganapathiraman | |
| 8,828,116 B2 | 9/2014 | Fuwa | |
| 2004/0150140 A1* | 8/2004 | Zhan | B82Y 30/00 264/430 |
| 2004/0261978 A1* | 12/2004 | Zhan | B82Y 30/00 165/104.11 |
| 2005/0036933 A1 | 2/2005 | Moy | |
| 2005/0067607 A1* | 3/2005 | Zhan | B82Y 30/00 252/502 |
| 2005/0186104 A1* | 8/2005 | Kear | B82Y 30/00 419/11 |
| 2006/0043649 A1 | 3/2006 | Ren | |
| 2006/0063005 A1* | 3/2006 | Gardner | B82Y 30/00 428/408 |
| 2009/0142590 A1* | 6/2009 | Tan | B82Y 30/00 428/336 |
| 2009/0269573 A1* | 10/2009 | Omori | B82Y 30/00 428/323 |
| 2009/0311166 A1* | 12/2009 | Hart | B82B 1/00 423/445 B |
| 2011/0045274 A1 | 2/2011 | Bao | |
| 2011/0124483 A1* | 5/2011 | Shah | B82Y 30/00 501/32 |
| 2012/0164429 A1* | 6/2012 | Shah | C22C 26/00 428/293.1 |
| 2013/0108666 A1* | 5/2013 | Zhang | C03C 14/002 424/400 |
| 2013/0237403 A1* | 9/2013 | Keller | C04B 35/563 501/87 |
| 2013/0237723 A1 | 9/2013 | Zhou | |
| 2013/0299749 A1* | 11/2013 | Tsutsumi | C04B 35/04 252/508 |
| 2014/0116491 A1 | 5/2014 | Reifenberg | |

OTHER PUBLICATIONS

Duchamp "Reinforcing multiwall carbon nanotubes by electron beam irradiation" Journal of Applied Physics Oct. 25, 2010 vol. 108, p. 084314-1 084314-6 American Institute of Physics Melville, NY USA.

Filleter "Ultrahigh Strength and Stiffness in Cross-Linked Hierarchical Carbon Nanotube Bundles" Advanced Materials, 2011, vol. 23, p. 2855-2860 Wiley-VCH Verlag GmbH & Co. KGaA, Weinheim, Germany.

Liu et.al. "Synthesis of Silicon Carbide Nanoparticles from Carbon Nanotubes" Advanced Materials Research Dec. 2012 vol. 602-604 p. 183-186 Trans Tech Publications Zurich, Switzerland.

Endo et.al. "Atomic Nanotube Welders: Boron Interstitials Triggering Connections in Double Walled Carbon Nanotubes." 2005 Nano Letters vol. 5 issue No. 6: p. 1099-1105. Author's copy enclosed Published on web DOI: 10.1021/nl0506271 ACS Publications Washington D.C. USA.

Nair et. al. "Fluorographene: A Two-Dimensional Counterpart of Teflon." Small 2010 vol. 6 No. 24: p. 2877-2884 Wiley-VCH Verlag GmbH & Co. KGaA, Weinheim, Germany.

Sato et. al. "Super-Robust, Lightweight, Conducting Carbon Nanotube Blocks Cross-Linked by De-fluorination" ACSNano 2008 vol. 2 issue No. 2: p. 348-356 ACS Publications Washington D.C. USA.

Sato et. al. "Influence of the structure of the nanotube on the mechanical properties of binder-free multi-walled carbon nanotube solids." Carbon 2012 vol. 50: p. 34-39 Elsevier Ltd. Waltham, MA.

Mathkar "Synthesis of Fluorinated Graphene Oxide and its Amphiphobic Properties" Particle & Particle Systems Characterization Mar. 2013 vol. 30, Issue 3, p. 266-272 DOI: 10.1002/ppsc. 201200091 Wiley-VCH Verlag GmbH & Co. KGaA, Weinheim, Germany.

Kim "Self-Healing Reduced Graphene Oxide Films by Supersonic Kinetic Spraying" Advanced Functional Materials Aug. 20, 2014 vol. 24, Issue 31, p. 4986-4995, DOI: 10.1002/adfm.201400732 Wiley-VCH Verlag GmbH & Co. KGaA, Weinheim, Germany.

Farbstein "Novel Carbon Nanotube Adhesive Materials" U.S. Appl. No. 61,878,328, filed Sep. 16, 2013 USPTO Washington D.C. USA.

Kim "Thermal Stability and structural changes of double-walled carbon nanotubes by heat tretament" Chemical Physics Letters 2004 vol. 398 p. 87-92 Elsevier B.V. Amsterdam, 1043 NX, Netherlands.

Zboril "Graphene Fluoride: A stable Stoichiometric Graphene Derivative and its Chemical Conversion to Graphene" Small Dec. 20, 2010 vol. 6 No. 24 p. 2885-2891 DOI:10.1002/smll.201001401 Wiley-VCH Verlag GmbH & Co. KGaA, Weinheim, Germany.

Shin "Synergistic Toughening of composite fibres by self-alignment of reduced graphene oxide and carbon nanotubes" Nature Communications Jan. 31, 2013 31 vol. 3 No. 650 doi:10.1038/ncomms1661 Macmillan Publishers Limited NY USA.

* cited by examiner

Fig.5A
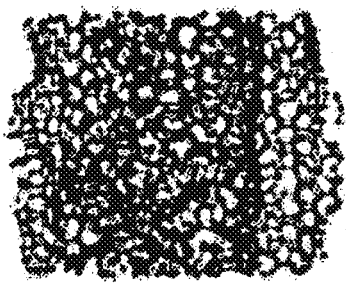
Fig.5B
Fig.5C
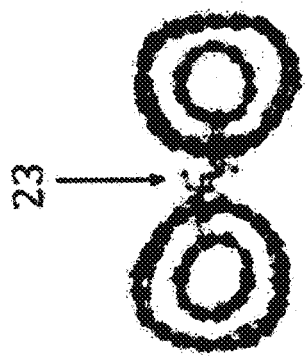
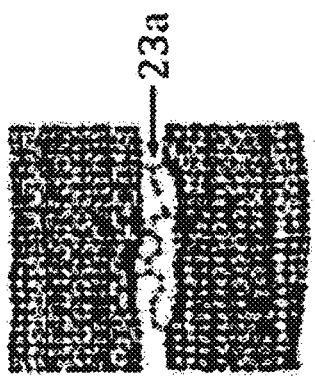
Fig.5E
Fig.5F
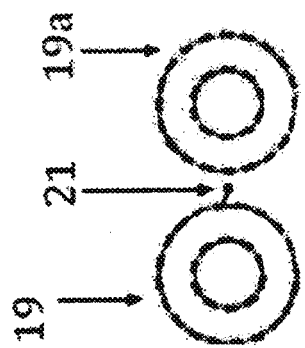
Fig.5D
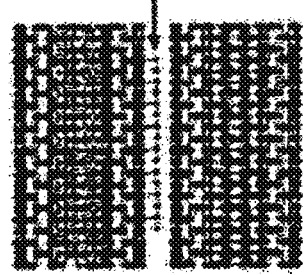

ULTRA HIGH STRENGTH NANOMATERIALS AND METHODS OF MANUFACTURE

This patent claims the benefit of Provisional Patent Ser. No. 61/069,147 filing date Mar. 13, 2008 which is incorporated by reference This patent claims the benefit of Provisional Patent Ser. No. 61/878,328 filing date Sep. 16, 2013 which is incorporated by reference

PRIOR ART

State of the art structural materials composed of carbon nanoparticles have aggregate tensile strength, bending strength, toughness, compressive strength and other strength parameters that are much lower than the strength of their constituent nanoparticles. For example; carbon nanotubes and graphene nanosheets can have Young's moduli of 1 terrapascal (TPa) or greater while the typical top tensile strength of graphene nanopaper rarely exceeds 30 gigapascals (GPa). The strength of carbon nanotube nanopaper is even lower—in the single gigapascal range. Even low quality carbon fibers and glass fibers exceed graphene paper in strength.

Spark plasma sintering (SPS) of fluorinated MWNT was observed to result in carbon materials with approximately three times the fracture bending strength and approximately twice the young's modulus of commercial graphite, and with high electrical and thermal conductivity. The fluorinated carbon nanotubes have large numbers of fluorine atoms sticking out from their surfaces. When they were compressed and subjected to thermal decomposition they became linked together with a very high density of covalent bonds between them. Experiments in the published scientific and technical literature show that other means of defluorinating them such as heating with hydrazine at low temperatures do not result in highly interlinked materials of that type. Although the SPS process was shown to link defluorinated MWNT carbon nanotubes with each other into high strength, high conductivity carbon materials, MWNT carbon nanotubes are expensive and it will be desirable to use less costly starting materials to manufacture similar materials. SPS processing is expensive and limited to small articles of manufacture also.

Prior art scientific literature describes the coalescence phenomenon observed when bundles of pure double walled carbon nanotubes (DWNT) were heated to high temperatures and were observed to fuse by coalescence of their outer walls—forming structures containing two single walled nanotubes enclosed by a single outer wall, graphene nanoplatelets and other structures. Formation of welded triple junction and quadruple junction structures from intersecting double walled carbon nanotubes was also shown when the DWNTs were doped with 0.05% wt. boron and heated to suitable temperatures. Although the nanoscale coalescence of double walled carbon nanotubes was noted as a reproducible phenomenon, no method has been found to promote extensive fusion of nanotubes in a bulk material. The present invention provides a solution to that problem and takes advantage of the above detailed phenomena to manufacture increased strength bulk solids and nanopapers.

"Functionalized Nanoscale Fiber Films, Composites, and Methods for Functionalization of Nanoscale Fiber Films," US 20110045274 A1 details methods of functionalizing carbon nanotubes in buckypaper used to reinforce polymer matrix composites. It illustrates the state of the art in nanotube nanocomposite materials where functional groups that covalently bond with a polymer matrix are covalently bonded to the reinforcing carbon nanotubes comprising buckypaper. In that patent it is claimed that the functional groups serve to increase dispersion of the carbon nanotubes in the surrounding matrix. In that method for making a composite, the method comprises providing a network of functionalized nanoscale fibers and combining the network of functionalized nanoscale fibers with a matrix material to form a composite where the added epoxide groups react with the epoxy resin to bond the epoxy resin to the nanoscale fibers. In some embodiments of their invention composite articles having Young's moduli ranging from 47 GPa to 350 GPa were claimed and in other embodiments, they claimed articles having tensile strengths ranging from 620 MPa to 3.2 GPa. That process added functional groups to the SWNT outer walls that helped bond the SWNTs with the matrix. Their process is limited to carbon nanotube nanopaper and cannot mass produce bulk solid materials having the high Young's modulus they achieved with 9 $cm^2$ pieces of nanopaper. Their materials have the further disadvantage that they contain polymer matrixes that will burn and decompose under high temperature oxidative conditions. They will be weakened by exposure to organic solvents used in chemical processing industries also. Its tensile strength is exceeded by that of graphite fibers and carbon nanotubes are much more expensive than graphite fiber composites with comparable young's modulus.

In general, bonding of functional groups by the polymer matrix reduces nanotube slippage and pulling when the composite material is bent or stretched. Although slippage in polymer matrixes is reduced, it is still present to a lower degree, and the remaining amounts of slippage are large enough to cause reductions in the strength of the composite materials, and they fail to attain the strength of their constituent carbon nanotubes—1 TPa and greater. The lower Young's modulus and tensile strength of the polymer matrix in comparison with the strength of the nanotubes reinforcing those composites also reduces the overall strength of that type of composite material.

Upon electron beam irradiation, it was found that single MWNT nanotubes with a bending modulus exceeding 10 GPa get stiffer by up to a factor of five. (Duchamp 2010) That was attributed to covalent cross linkage of the concentric walls of the MWNT which reduced slippage. Very large enhancements in the effective tensile strength and modulus of single bundles of DWNT bundles after irradiation with 200 kV electrons were measured. Irradiated bundles were found to exhibit an effective tensile strength as high as ~17 GPa whereas the effective Young's modulus of irradiated bundles was found to increase by as much as 16 times that of uncrosslinked bundles to 700 GPa, approaching the Young's modulus of individual CNTs.

A linear increase in effective Young's modulus and an exponential increase in effective tensile strength were observed for increasing doses of 200 keV electrons in the range of up to 9-11×$10^{20}$ e/$cm^2$ demonstrating the ability to tailor the mechanical properties of CNT bundles with low dosages (Filleter 2011). The prior art fails to provide methods of manufacturing DWNT objects big enough to be seen with the naked eye with these characteristics. Nor does it provide methods of manufacturing bulk materials such as nanopaper, fibers, or useful macroscopic articles with ultra high young's modulus.

"Electrical Current-Induced Structural Changes and Chemical Functionalization of Carbon Nanotubes," U.S. Pat. No. 8,758,717 B2 details methods of cutting, thinning welding and chemically functionalizing carbon nanotubes. Electrical resistance heating of thin films of MWNTs caused increases in electrical conductivity that were attributed to formation of nanostructural welds between the nanotubes. Electromigration and evaporation were theorized to rearrange the carbon atoms, thickening the electrical connections between them and bridging gaps between the carbon nanotubes suspended by Van der Waals force fields. Their method is not amendable to scale up for structural reinforcement purposes and differs from the invention disclosed here in that it lacks densifying procedures to manufacture strong tough composites. Their experimental material was porous and nondense.

The experimental synthesis of cubic silicon carbide (3C-SiC) nanoparticles by direct reaction of silicon powders and carbon nanotubes was reported. (Liu 2012) Their results and results from other experiments summarized by them were all characterized by the one dimensional nature of the carbide products obtained from the reactions of carbon nanotubes with carbide-forming elements supplied in gaseous or solid nanoparticle form. Their methods resulted in nanostructures that were all unlinked.

"Covalently Bonded Graphene Coating And Its Applications Thereof," WO 2014004514 A1 and PCT/US2013/047627 relates to production of covalently-bonded graphene coating on various solid substrates using a combination of graphene, graphene oxide or graphite and a silicon compound material with or without metal containing compounds in an air free environment, preferably under vacuum, at high temperatures. The solid substrates may be ceramics, glass, quartz, silicon wafers, metals, metal alloys or any solid materials which can stand high temperatures. They can be in shapes such as plates, fibers, spheres, films or any regular or irregular shapes. The graphite or graphene containing materials can be graphite powders or particles with or without functionalization, graphene oxide powders, particles, films or papers with or without functionalization, and graphene powders, particles, films or papers with or without functionalization. The silicon and metal containing compounds can be, but not limited to, silicon containing polymers with and without fillers, cyano-containing polymers or compounds, metal halide, and metallocenes.

The solid substrates, the graphite or graphene containing materials, and the silicon/metal containing compounds are placed in an air free environment such as a vacuum furnace at temperatures ranging from 750° C. to 1200° C., preferably 850° C. to 1000° C. When the temperature inside the air free environment reaches a high enough temperature, the silicon/metal containing compounds would vaporize and the graphite or graphene containing materials would expand and float to coat the surface of the solid substrates, which would also be activated under this circumstance. It is believed that the edge carbon atoms of graphene nanosheets may form covalent bonds such as (—C—O—Si—), (—C—Si—), (—C-0-M-) or (—C-M-) among themselves and with the silicon and or metal atoms in the substrate. It should be noticed that the silicon and metal containing compounds can be used alone without graphite/graphene oxide/graphene in this process to produce covalently-bonded silicon, silicon/metal, silicon oxycarbide or silicon carbide coating on the solid surface.

The prior art cited above has certain limitations. Its is restricted to coatings on "solid substrates, ceramics, glass, quartz, silicon wafers, metals, metal alloys or any solid materials which can stand high temperatures. They can be in shapes such as plates, fibers, spheres, films or any regular or irregular shapes" The above prior art patent also does not provide materials or methods for manufacturing inorganic carbide nanograined materials fashioned into nanopaper, laminated composites, solid articles, molded articles and high strength structural reinforcing materials. The prior art patent is also limited to graphene and graphite powders and makes no claims about covalently bonding carbon nanotubes or other carbon nanoparticles useful for manufacturing ceramic nanomaterials. The prior art invention bonds the edge carbons of the graphene nanosheets and graphite particles but it does not bond layers of graphene nanosheets above and below each other as the presently disclosed invention does. And it has no provision for connecting the graphene nanosheets with fused nanostructures that weld them together into extremely high strength materials.

Carbide Nanofibrils And Method Of Making Same US 2005/0036933 A1, details methods of producing a plurality of SiC fibrils predominantly having generally uniform diameters substantially less than 100 nm from a plurality of carbon nanofibrils or nanotubes having dimensions of about 50 nm or less by reaction With SiO gas at a relatively low temperature, sufficiently high to cause reaction of said gas with the carbon of said nanofibrils to form, in situ, solid SiC, but sufficiently low to prevent substantial fusing together of individual said nanofibrils. This temperature is substantially less than 1700° C., and preferably in the range of about 1000° C. to about 1400° C., most preferably approximately 1200° C. They produced high strength solids composed of carbide fibers in metal matrixes but deliberately avoided reactions that would have fused the nanofibers to each other as the present invention described here does.

In Carbide Nanofibrils And Method Of Making Same U.S. Pat. No. 7,393,514 B2, The same inventors discussed the size effect of using nanoparticle grains in a composite " . . . some efforts have been directed towards the development nanophase ceramics and nanophase ceramic composites. Dramatically different properties can be obtained by making ceramic composites and by making ceramic materials into nanograin structured materials. For examples, the toughness and strength of nanophase Al2O3-SiC composites are two to five times greater than those of the same materials with conventional structures, and a Si3N4-SiC nanophase composite can be stretched to two and a half times its original length at 1600° C."

The present invention uses nanoparticles and mixtures of nanoparticles as the starting materials for manufacturing ultrafine grained nanophase ceramics and nanomaterials that take advantage of the size effects discussed above in combination with the interlinkage effects discussed above to provide increased strength and toughness.

SUMMARY OF THE INVENTION

The present invention provides methods of manufacturing inorganic nanopaper, laminates, fibers, coatings, films and solid materials with increased strength. The methods include the generalized steps of densifying carbon nanoparticles to put them into physical contact with each other and treating the materials to provide fused structures with dense aggregations of covalent bonds connecting the nanoparticles to each other. One embodiment takes advantage of the coalescence phenomenon observed when bundles of pure double walled carbon nanotubes were heated to temperatures ranging from of 2100° C.-2500° C. The bundles were observed to fuse by coalescence of their outer walls—forming structures containing two single walled nanotubes enclosed by a single outer wall, graphene nanoplatelets and other structures Adding 0.05% boron to double walled carbon nanotubes resulted in similar fused structures linking the bundles and also formation of welded triple junction and quadruple junction structures derived from intersecting double walled carbon nanotubes heated at temperatures ranging from 1600° C.-2100° C.

In one embodiment divulged here, pure double walled carbon nanotube powder is mixed with elemental boron at concentrations sufficient to cause fusion of nanotube walls and welded multiple junction linkages, and compressed in a vacuum hot press at approximately 1700° C.

Other embodiments produce compressed carbon nanotube materials with increased strength by hot pressing pure double walled carbon nanotube powder at 2150° C. for a sufficient amount of time to cause fusion of nanotubes.

Another embodiment of the invention provides a method of manufacturing high strength laminated materials. Double walled carbon nanotubes can be densified by use of vacuum assisted assembly (VAAS) apparatus. In those embodiments the double walled carbon nanotubes are collected at the bottom of a filtration apparatus resulting in double walled carbon nanotube paper and high strength laminated materials are obtained by hot pressing multiple layers of the nanopaper at approximately 2150° C. or higher temperatures until nanotube fusion takes place.

Networks of intersecting DWNTs can be fused into dense materials composed of interlinked DWNTs having the young's modulus and tensile strength of DWNTs in their unwelded parts. The DWNT nanostructures will be linked by the smoothly welded parts that retain their high strength graphene nanotube wall structures. If DWNTs with greater than 1 TPa young's modulus are used as starting material, the fused material might retain a large fraction of that strength.

The general methods divulged here can be used to manufacture high strength carbide nanomaterials by employing the general principles of the invention. Carbon nanotubes and carbide-forming nanoparticles are mixed and densified, then heated to reaction temperature. One embodiment for manufacturing high strength carbide nanomaterials mixes approximately equal amounts of powders of multiwalled carbon nanotubes (MWNT) with similar size silicon nanowires and heats them in a vacuum hot press at 1800° C. at 80 MPa for 1-2 hours to fuse the silicon nanowires and the MWNT.

Embodiments for manufacturing carbide nanopaper and laminated silicon carbide objects are also claimed. An embodiment for manufacturing high strength silicon carbide laminates starts with MWNT nanopaper containing pores approximately the same size as the width of the MWNT nanotubes. The nanopaper is infiltrated with trichlorosilane gas (or liquid) and subsequently heated to the temperature of decomposition of trichlorosilane—400° C. After outgassing of chlorine, stacks of the silicon infiltrated nanopaper are pressed in a vacuum hot press at 1800° C. for 1-2 hours. Depending on the exact processing conditions the final product will consist of finely nanostructured linked silicon carbide nanorods, or dense networks of interlinked carbon nanotubes and silicon carbide nanoparticles.

Many other variations of the process are possible such as using nanopaper manufactured from a combination of silicon nanowires and carbon nanotubes as the starting material for production of laminated silicon carbide nanocomposite materials.

Other carbon nanoparticles such as graphene nanosheets can be used to manufacture extremely high strength carbide materials by mixing them with carbide-forming nanoparticles. One embodiment disclosed here mixes boron nanoplatelets and few layer graphene nanosheets of approximately the same size into suspensions and subsequently employs vacuum assisted assembly apparatus to manufacture aligned boron-graphene nanosheet nanopaper. The nanopaper is stacked into a multilayer laminate and heated in a vacuum hot press at approximately 2,763° C. to cause fusion of the nanoparticle structures into aligned brick and mortar structured nanomaterials with very high toughness, bending strength, tensile modulus, compressive strength and other valuable properties.

Claimed embodiments of the present invention apply the spark plasma sintering process to fluorinated graphene nanosheet powder under 80 MPa compression at 1000° C. for approximately 10 minutes. Other embodiments mix equal amounts of fluorinated graphene nanosheets and fluorinated MWNT into suspensions that are placed into vacuum assisted assembly apparatus to produce nanopaper that is subsequently heated in spark plasma sintering presses at the same pressure and temperature for the same length of time as the above embodiment. The materials resulting from complete defluorination of fluorinated carbon nanoparticle powders are nearly 100% pure carbon and possess high hardness, bending strength, Young's modulus and electrical conductivity.

The methods divulged here can be employed in combination with suitably designed rapid prototyping apparatus. Embodiments of the invention provide nanoparticle starting materials for additive manufacturing of rapid prototyped objects employing means including, but not limited to, selective laser sintering of mixtures of carbide-forming nanoparticles and carbon nanoparticles to cause formation of carbide regions linking those nanoparticles, selective laser sintering and e-beam sintering of DWNT powder and boron doped DWNT powder, e-beam and ion beam sintering of a variety of carbon nanoparticle powders, laser beam sintering of fluorinated carbon nanoparticles and radiation beams of a variety of different types to promote bonding in laminated object manufacturing (LOM).

As a result of the combined densification and irradiation processes, the nanoscale materials will have increased tensile modulus, increased tensile strength, increased hardness, increased lubricity and increased fracture toughness compared with less finely grained materials. Other material properties such as decreased contact resistance, increased heat conductivity and increased electrical conductivity are also provided by the present invention. Materials with valuable tribological, magnetic, photonic, electrical rectifying, insulating, and EMI blocking properties are also provided by irradiating the starting materials using the methods and apparatus disclosed here.

DESCRIPTION OF THE INVENTION

Brief Description of Drawings and Reference Numerals

Figure 2:
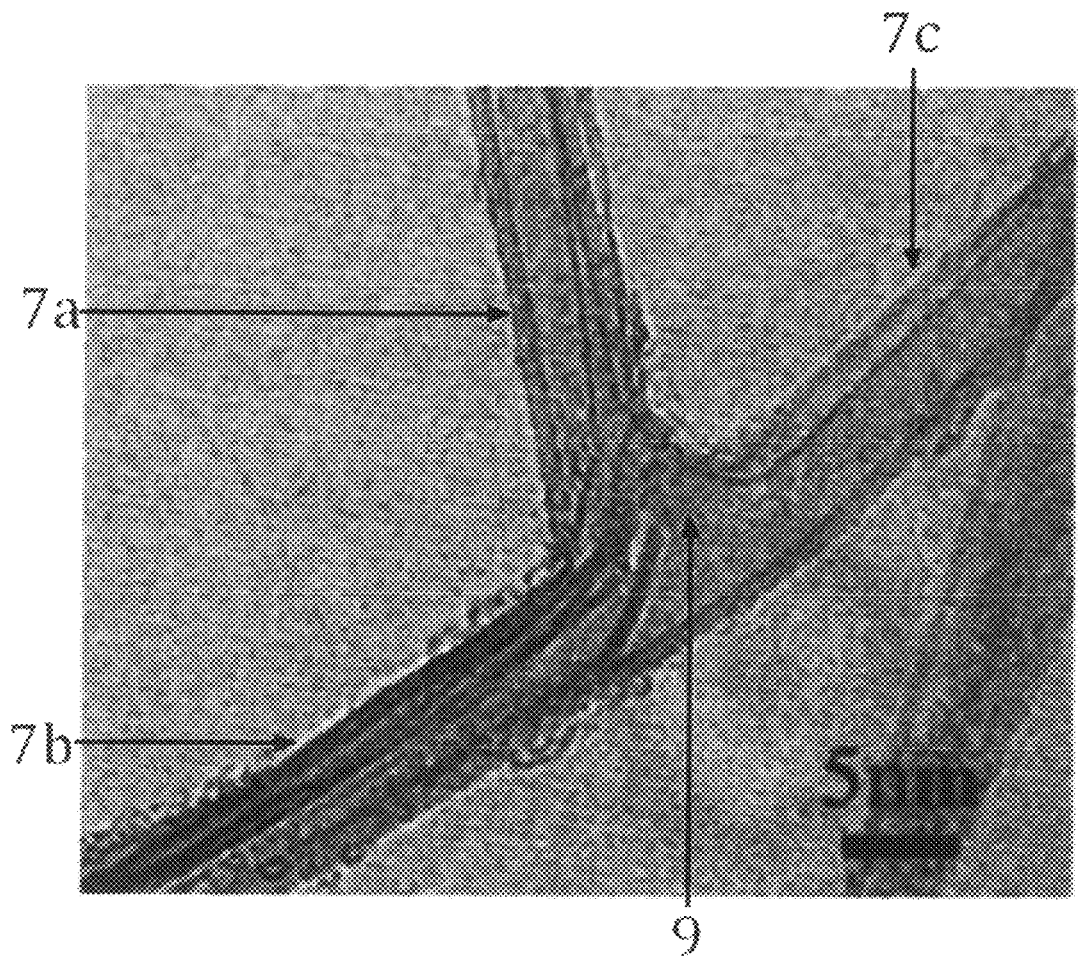
Figure 3:
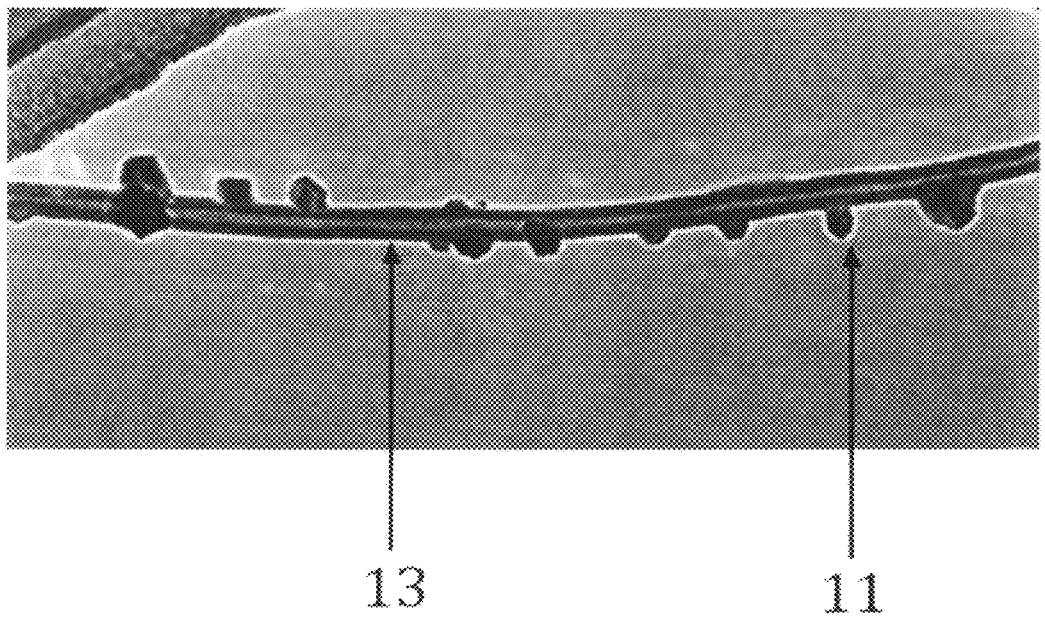
Figure 4:
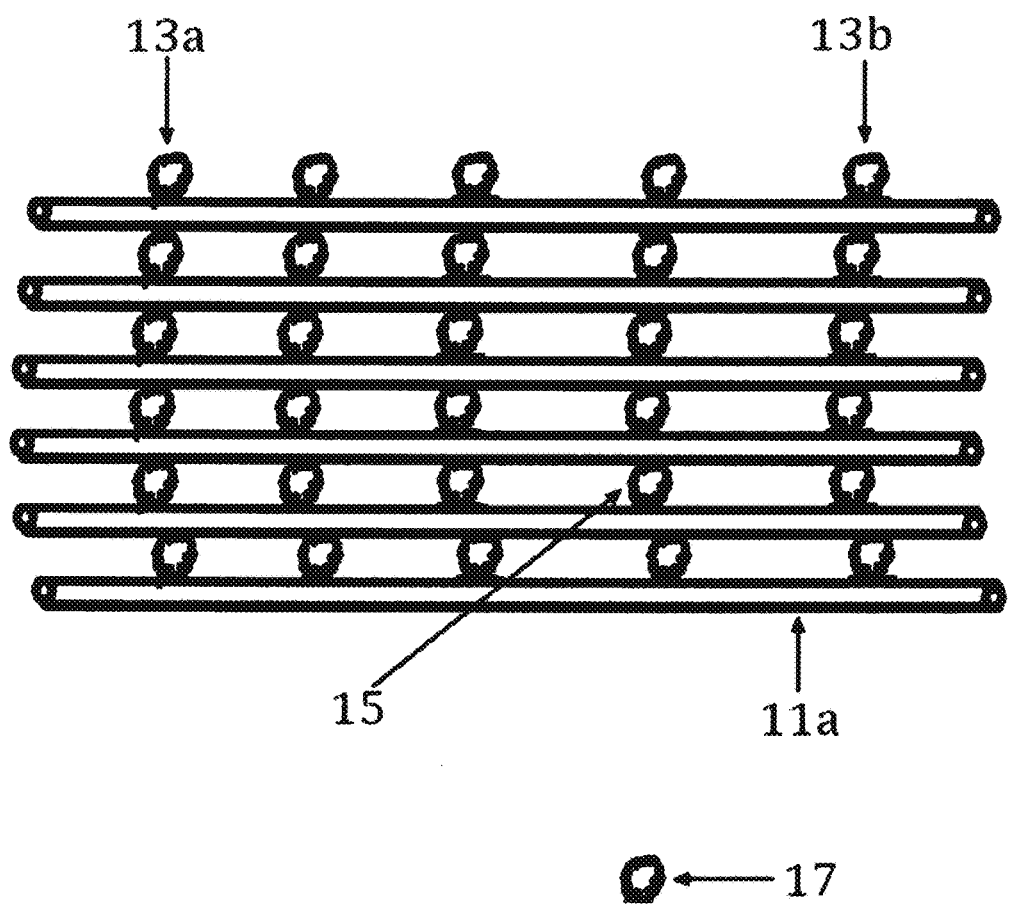
Figure 6:
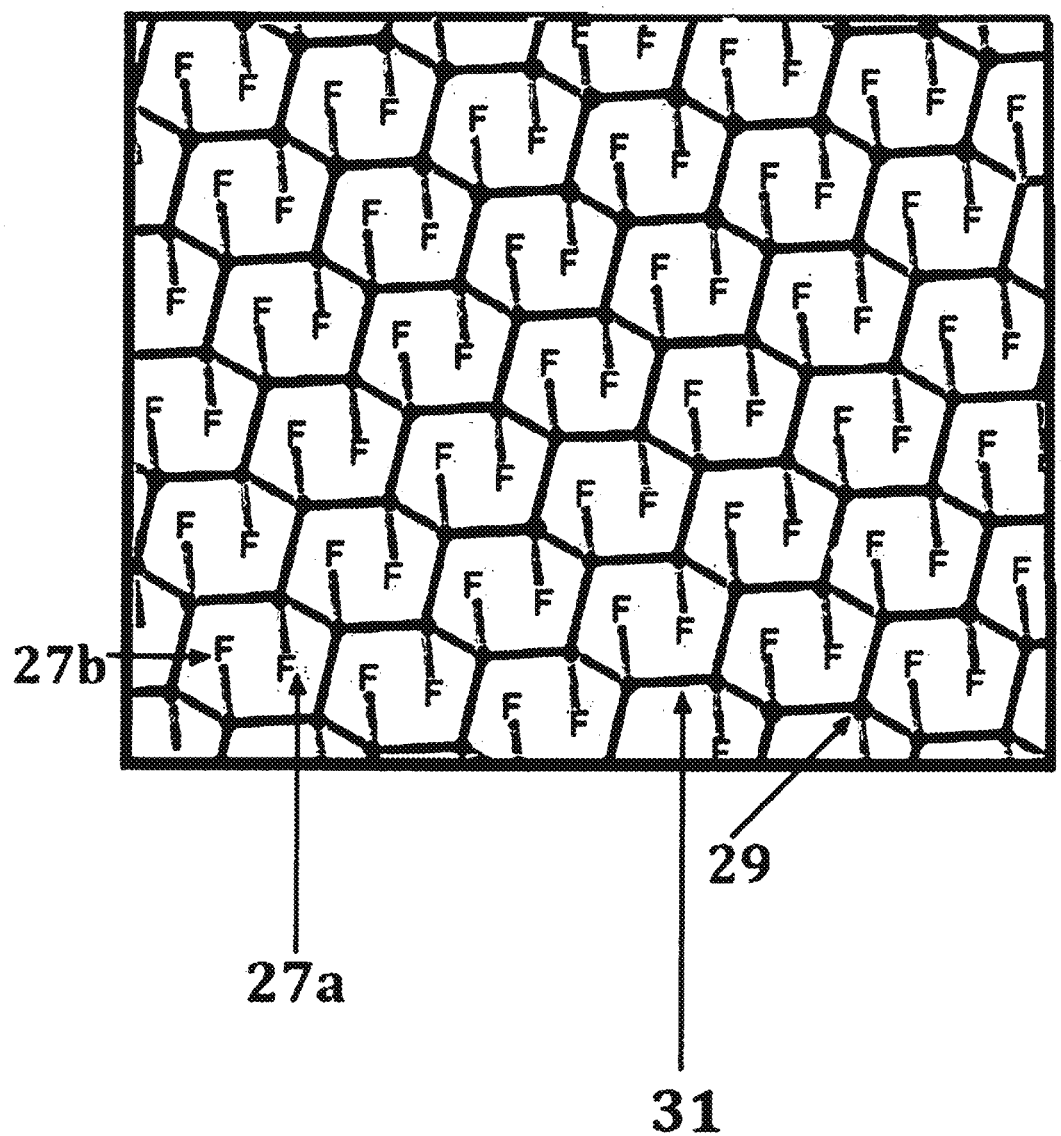
Figure 7:
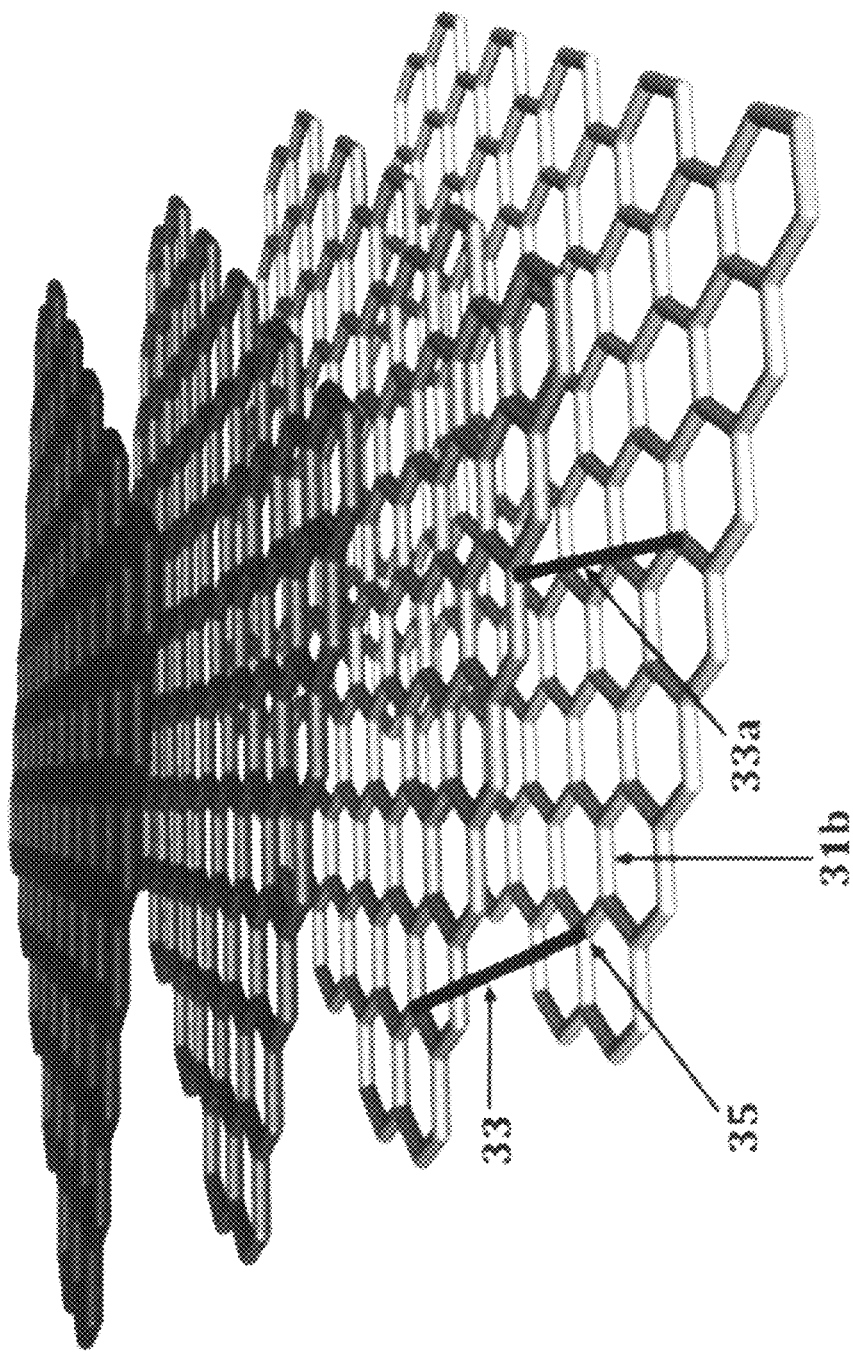
Figure 8:
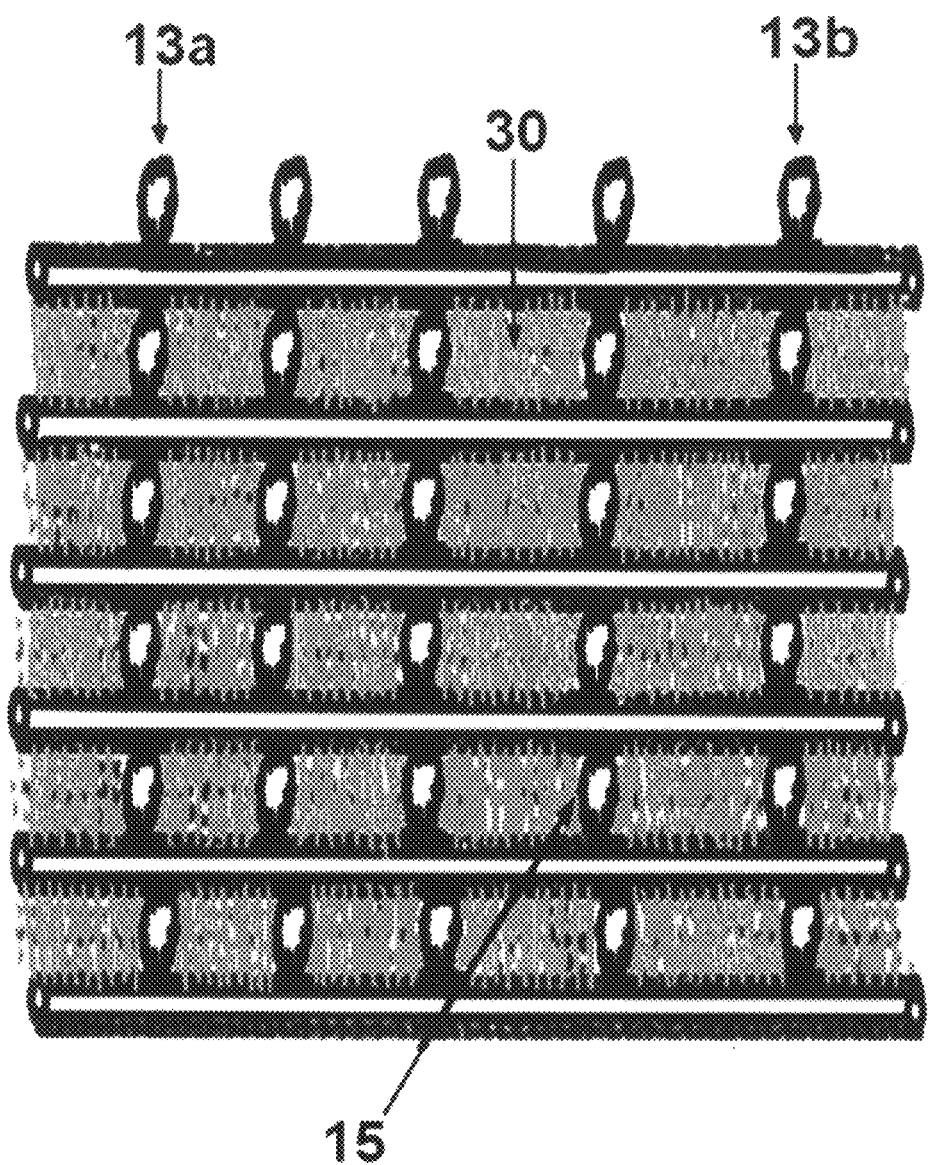
Figure 9:
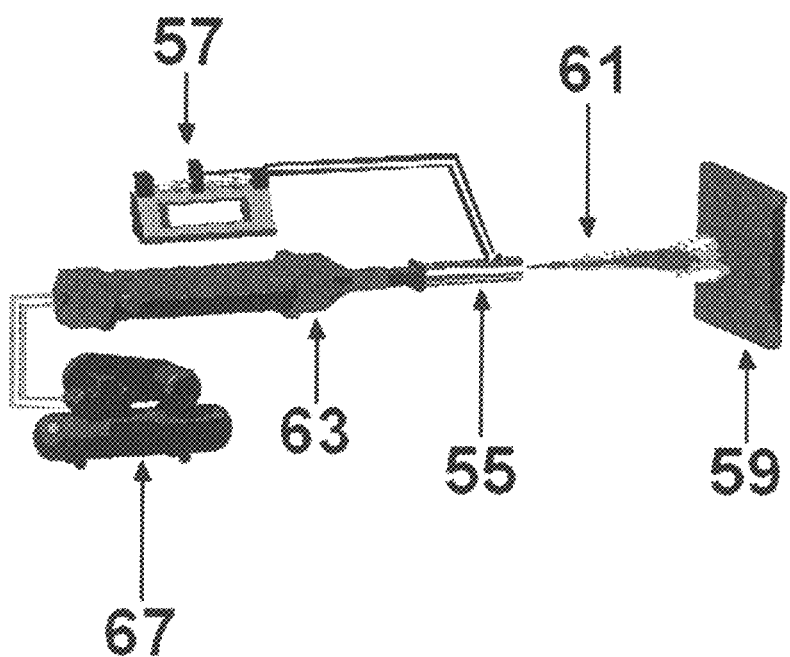
Figure 10A:
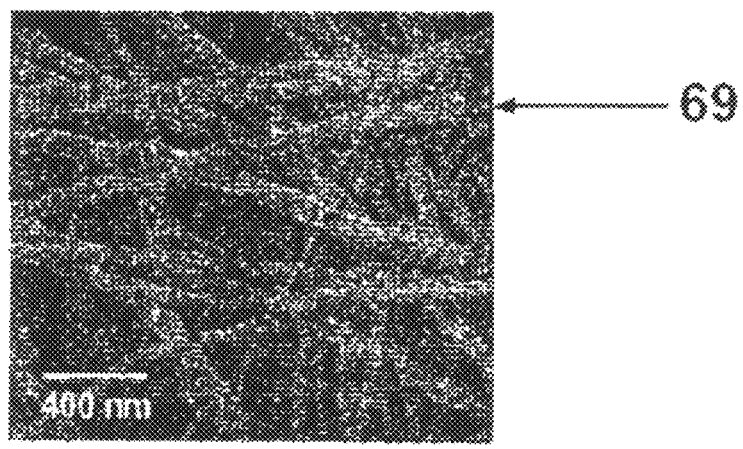
Figure 10B:
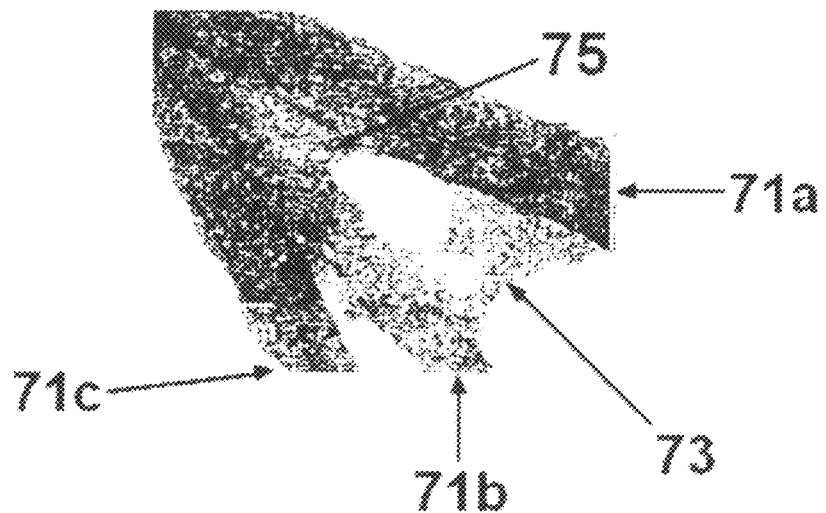
Figure 11:
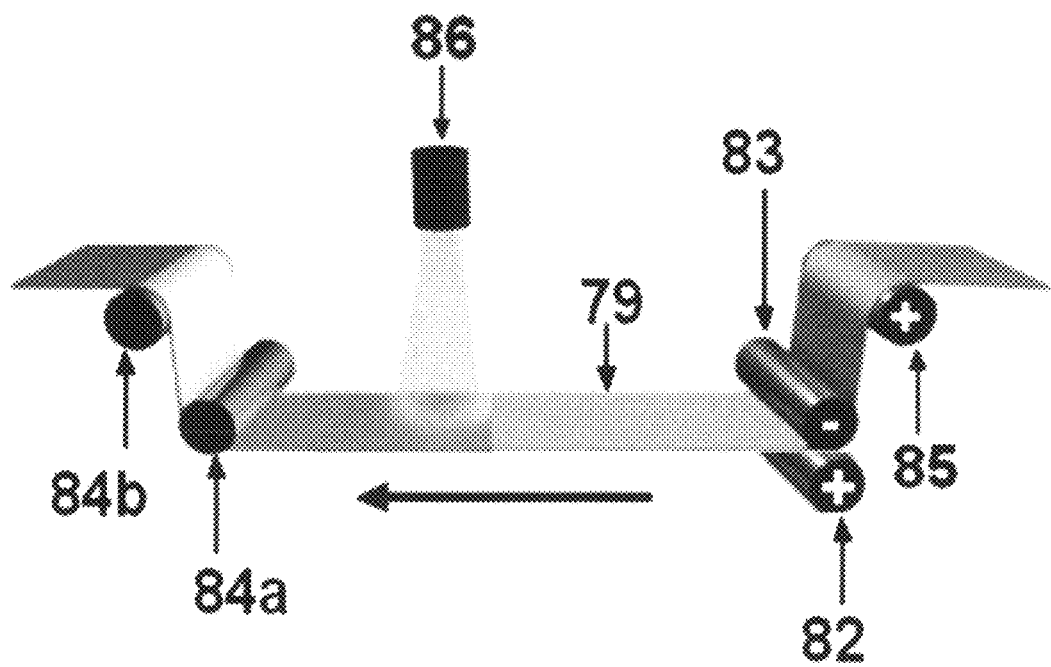
Figure 12:
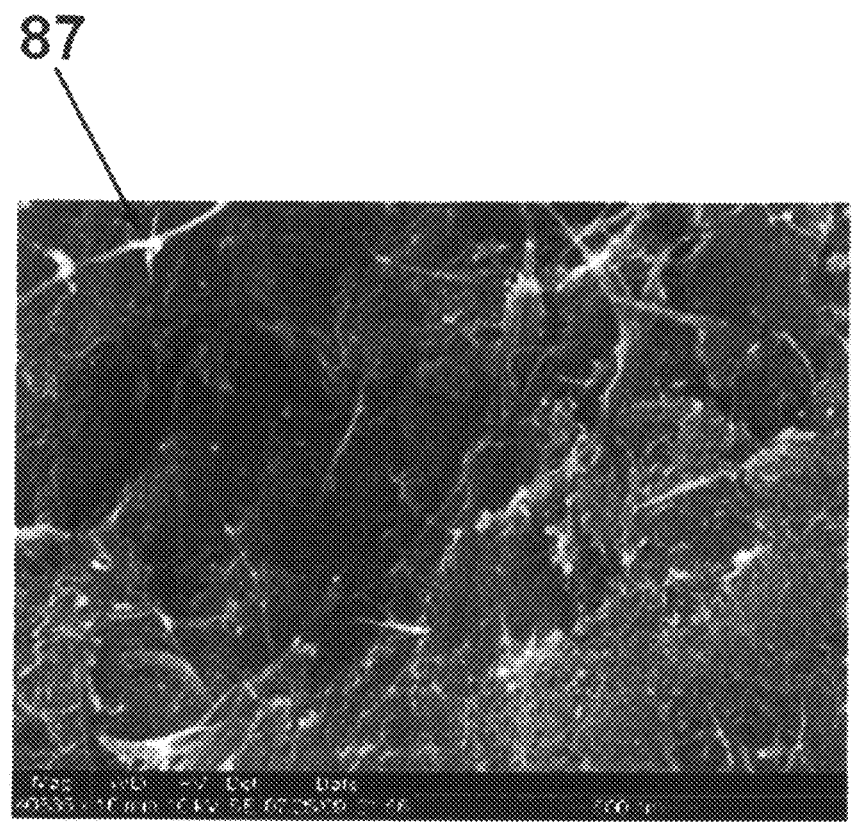
Figure 13:
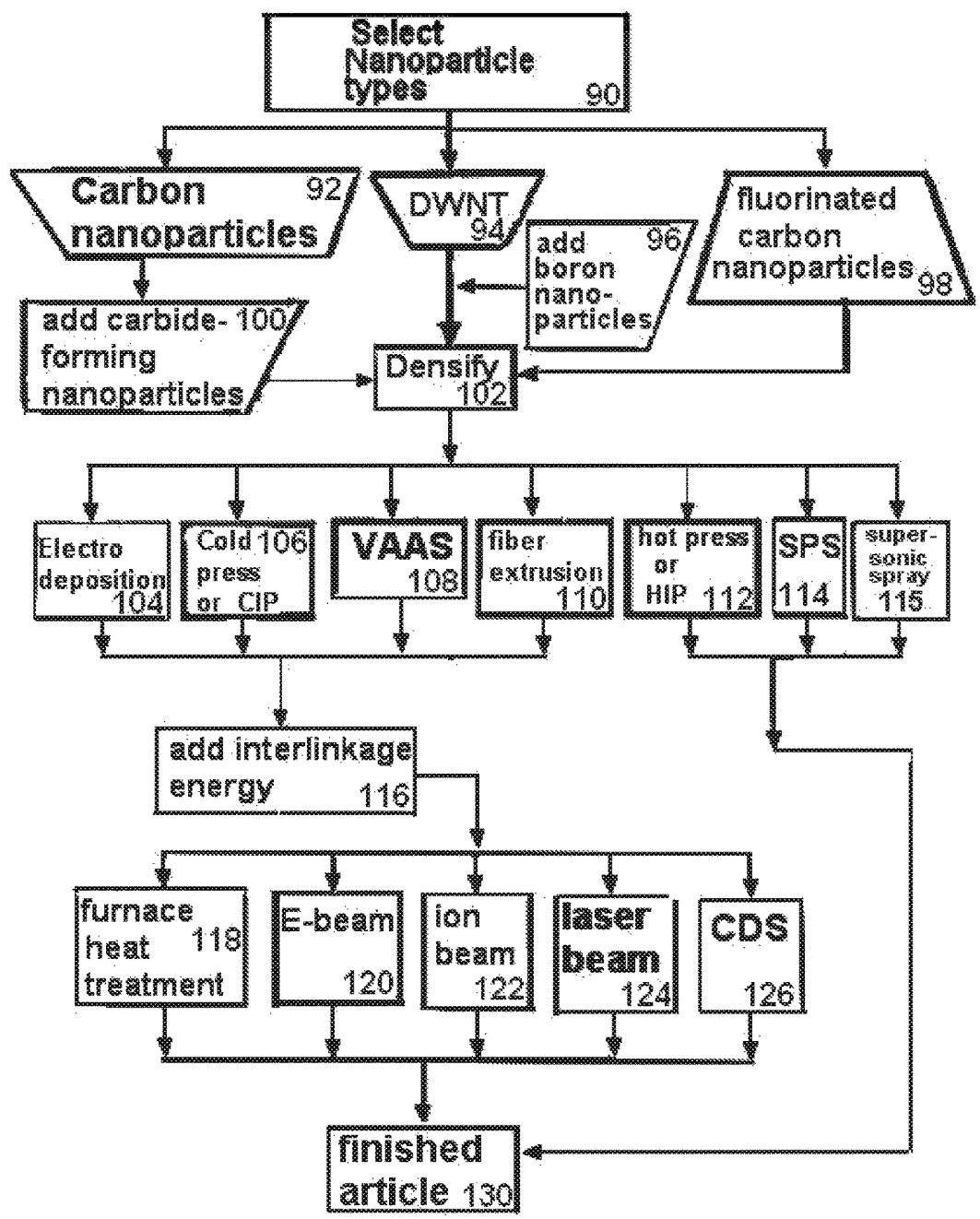

FIG. 1 Hybrid nanostructure—carbon nanotube fused to graphene nanosheet
1 top of carbon nanotube
3 graphene nanosheet
5 joining region of fused carbon nanotube and graphene structures
5a joining region of fused carbon nanotube and graphene structures
FIG. 2 Two double walled carbon nanotubes fused together into triple junction
7a double walled carbon nanotube region
7b double walled carbon nanotube region 7c double walled carbon nanotube region
9 triple junction weld
FIG. 3 TEM image of carbon nanotube with 14 boron carbide nanolumps fused to it
11 boron carbide nanolump fused to multiwalled carbon nanotube
13 multiwalled carbon nanotube
FIG. 4 Densified carbon nanotube—boron carbide nanolump material
11a MWNT carbon nanotube
13a boron carbide nanolump fused to MWNT
13b boron carbide nanolump fused to MWNT
15 boron carbide nanolump fused between two MWNT carbon nanotubes
17 MgB2 (magnesium diboride) nanoparticle
FIG. 5 Double walled carbon nanotubes (DWNTs) fusing together by catalytic action of boron nanoparticles
19 DWNT
19a DWNT
21 boron atom singly bonded to left double walled carbon nanotube (DWNT)
21a line of boron atoms all singly bonded to top DWNT
23 boron atoms catalyzing interlinkages between left and right DWNTs
23a boron atoms catalyzing interlinkages between top and bottom DWNTs
25 2 DWNTs have fused into a single carbon nanotube
FIG. 6 Fluorinated graphene molecular diagram
27a fluorine atom projecting below graphene nanosheet plane
27b fluorine atom projecting above graphene nanosheet plane
29 carbon atom
31 in-plane SP2 carbon-carbon covalent bond
FIG. 7 multilayered graphene with 2 SP3 covalent linkages
31b in-plane SP2 carbon-carbon covalent bond
33 SP3 carbon-carbon bond
33a SP3 carbon-carbon bond
35 carbon atom bonded to 4 carbon atoms
FIG. 8 The material shown in FIG. 4 filled with silicon carbide
13a boron carbide nanolump
13b boron carbide nanolump
15 boron carbide nanolump fused between two MWNTs
30 silicon carbide region
FIG. 9 apparatus for supersonic graphene spray
55 supersonic nozzle
57 syringe pump
59 substrate
61 fluorinated graphene spray
63 gas heater
67 compressor
FIG. 10 porous MWNT film welded by electric current
FIG. 10 A
69 multiwalled carbon nanotube (MWNT)
FIG. 10 B
71a MWNT
71b middle MWNT
71c MWNT
73 weld
75 weld
FIG. 11 Roll to roll apparatus used to make interlinked nanoparticle paper
79 nanopaper sheet
82 positive roller-electrode
83 negative roller-electrode
84a roller
84b roller
85 positive roller-electrode
86 irradiation source
FIG. 12 TEM of fused boron doped DWNT bundles described in U.S. 61/069,147
87 intersecting fused DWNT bundles
FIG. 13 Nanomaterials manufacturing process flowchart
90 select nanoparticle type or types
92 carbon nanoparticles
94 DWNT—double walled carbon nanotubes
96 add boron nanoparticles
98 fluorinated carbon nanoparticles
100 add carbide-forming nanoparticles
102 densify
104 electrodeposition
106 cold press (including cold isostatic pressing, CIP)
108 vacuum assisted assembly (VAAS)
110 fiber extrusion
112 hot press (including hot isostatic pressing, HIP)
114 spark plasma sintering (SPS)
115 supersonic spray deposition
116 add interlinkage energy
118 furnace heat treatment
120 electron beam (e-beam)
122 ion beam
124 laser beam
126 capacitive discharge sintering (CDS)
130 finished article

DETAILED DESCRIPTION OF INVENTION

The present invention overcomes the problems of the prior art by providing methods of placing high strength carbon nanoparticles in close contact with each other and simultaneously providing sources of energy to cause rearrangement of atoms to form large numbers of welded or fused nanostructures that bridge the nanoparticles and hold them together. Fulfilling all of these conditions in combination results in stiff, fracture resistant materials with very high young's modulus, tensile strength, ultimate breaking strength, compressive strength, high electrical conductivity and thermal conductivity. Materials containing dense assemblages of interconnected nanoparticles might have other valuable properties as a result of their composition for example iron carbide and nickel carbide nanostructured materials have novel and valuable magnetic and electromagnetic interference shielding properties.

Fused Nanostructures

Referring to FIG. 1, it shows a nanostructure consisting of a carbon nanotube fused with a graphene nanosheet. It shows regions of carbon atoms seamlessly connecting the end of the nanotube to the graphene sheet. The completely seamless connected nature of the two nanostructures prevents rips that lower tensile strength and fracture toughness. There is a relatively large number of covalent chemical bonds in the small region connecting the two nanostructures with each other. The single walled carbon nanotube structure extends from the top 1, to the bottom joining region of fused carbon nanotube and graphene nanosheet 5. The unfused portion of the graphene nanosheet is shown by 3 while 5a also points to part of the fused nanostructure weld where the graphene nanosheet 3 and the carbon nanotube 1 are fused and connected with multiple cyclic carbon ring structures. According to "Graphene-Carbon Nanotube Hybrid Materials and Use as Electrodes" WO 2013119295 A1, TEM and scanning TEM (STEM) images of CNT-graphene junctions show that the welded connection regions are directly observable.

Fused DWNT Nanomaterials

Referring to FIG. 2 and FIG. 5; FIG. 2 shows a transmission electron microscope (TEM) image of two double walled carbon nanotubes that fused into a single Y shaped nanotube structure after doping with boron and high temperature heat treatment Elemental boron (0.05% wt.) was mixed with the nanotubes before heat treatments. The ultra high magnification transmission electron microscope (TEM) picture shows that the two nanotubes have fused with the outer wall blending seamlessly into a single structure that retains the strength, closed graphene sheet topology, and bond structure of DWNTs. (Endo 2005) There is a relatively large number of covalent chemical bonds in the small region connecting the two nanostructures with each other. Welded triple and quadruple junctions have been observed when boron doped DWNTs were heated to temperatures between 1600° C. and 1900° C. Although other nanotube fusions were observed when undoped DWNTs were heated between 2100° C. and 2500° C. they were not as complete. Referring to FIG. 10, they resembled the nanotube welds shown in FIG. 10b that contained some amorphous carbon material bridging the MWNTs produced by passing a current through a thin nondense film. The TEM of welded MWNTs of those nanotubes shows less complete fusions where the welds consist of amorphous carbon as opposed to the higher strength closed graphene sheet nanostructures found connecting the coalesced DWNTs.

While not wanting to be bound by theory, it is believed that very dense interconnected networks of DWNTs that have been fused together smoothly, creating multiple nanotube junctions, will possess the maximum strength of all of the materials disclosed here. Those bulk materials will potentially exceed the 700 GPa young's modulus observed in e-beam fused DWNT bundles. (Filleter 2011) DWNT bundles consist of dense assemblages of DWNT nanotubes all aligned in parallel orientation. The greatest strength materials will be produced by fusion of nonparallel, intersecting DWNTs.

Referring to FIG. 5, In FIG. 5a—top, 2 double walled carbon nanotubes (DWNT) 19 and 19a are shown side by side in top down view in a computer simulation. A boron atom 21 bonded to the left DWNT extends toward the right DWNT. In FIG. 5b—top, (top down view) high temperature heat treatment has caused the boron atom 23 to catalyze bonds between the two DWNTs, linking them together. In FIG. 5b—bottom, a line of 12 boron atoms 21a are bonded to the top DWNT and after high temperature heat treatment they are shown to catalyze fused structure interlinkages 23a between the top and bottom DWNTs. FIG. 5c shows that the two side by side DWNTs have been entirely fused into a single bigger diameter DWNT at the end of the process.

Referring to FIG. 12, A TEM image of two perpendicular fused DWNT bundles 87 is shown. They are the same material disclosed in provisional patent application 61/069, 147. The nanostructure was synthesized by pressing partially exfoliated DWNT powder followed by a 30 minute heat treatment in argon at 1600° C. The powder was doped with 0.05% elemental boron. While not wanting to be bound by a particular theory it is believed that the fused bundles resulted from the combination of pressure that placed the two bundles into close contact with each other, the boron doping, and the heat treatment. It is further thought that the DWNT coalescence phenomenon shown in FIG. 3 took place when added boron promoted fusion of the DWNTs comprising the nanotube bundles. (Endo 2005) It is also believed that when DWNTs are completely exfoliated yielding single unbundled nanotubes, those boron doped DWNTs can be densified and that a maximum number of intersections will be present. They will be fused by heat treatments yielding the highest number of welded DWNT junctions and that will result in the highest strength materials possible using the disclosed method. Its is probable that less than complete exfoliation also limited the penetration of boron dopant into those DWNT bundles 87 and that complete exfoliation is necessary for that process to promote optimum product strength. One embodiment of the disclosed invention uses boron doped, exfoliated DWNT powder as the starting material and it is hot pressed in inert noble gas atmospheres or in vacuum. Other sources of boron besides elemental boron such as boric acid or thermally decomposed borane can be used in other embodiments. The VAAS vacuum filtration method (and others) can be used to manufacture high density carbon nanotube nanopaper. DWNT nanopaper can be further densified by roller pressing apparatus as shown in FIG. 11 or by other pressing and or densifying apparatus.

Other embodiments will compress the exfoliated DWNT powders in vacuum hot presses supplying heat and pressure simultaneously. Semialigned DWNT solid material shown in FIG. 12 was obtained by cold compression of partially exfoliated DWNT powder that was later processed in a furnace. Other embodiments will employ controlled inert atmosphere hot presses and other embodiments can be envisioned including use of spark plasma synthesis press apparatus to heat and press the boron doped DWNT starting material in either vacuum or inert gas atmospheres. Many other possible embodiments that use a variety of pressures, temperatures holding times, and boron concentrations might have utility in achieving the objects of the invention. Embodiments employing pure DWNTs without boron doping are envisioned as being substantially the same as the above methods of increasing the strength of compacted DWNT powders, nanopapers and fibers but with processing at different temperatures ranging from 2100° C. to 2500° C.

Referring to FIG. 10b, a TEM of MWNTs that have been welded by passing an electric current through an undensified nanotube film is shown. While not wanting to be bound by a particular theory it is believed that electric currents by themselves might promote the electromigration phenomenon observed in the fused MWNTs as well as heating those nanotubes. Thus it is thought there might be synergistic effects that cause DWNT fusion at lower temperatures, shorter periods of heating or with other changed conditions that differ from those used by the Endo group if energy from electric current apparatus is added to the process conditions for fused DWNT materials in the above embodiments. It should be noted that electric currents have been shown to increase diffusion of boron atoms in graphite.

It was noted in the prior art section that upon electron beam irradiation, single MWNT nanotubes with a bending modulus exceeding 10 GPa became stiffer by up to a factor of five. (Duchamp 2010) That was attributed to covalent cross linkage of the concentric walls of the MWNT which reduced slippage. Very large enhancements in the effective tensile strength and modulus of single bundles of DWNT bundles after irradiation with 200 keV electrons were measured. Irradiated bundles were found to exhibit an effective tensile strength as high as 17 GPa whereas the effective Young's modulus of irradiated bundles was found to increase by as much as 16 times that of uncrosslinked bundles to 700 GPa, approaching the Young's modulus of individual CNTs. It is thought that the above data is indicative that the processes detailed in this disclosure—heat treatments, electrical resistance heating, hot pressing, SPS, capacitor discharge sintering (CDS), electron beams and or ion beam irradiation might create bulk DWNT materials with strengths as high as those individual bundles—700 GPa Young's modulus and 17 GPa effective tensile strength; or higher. It is also to be expected that electron beam irradiation of macroscopic DWNT fibers, with and without boron doping will provide methods of strengthening those fibers and so will heat treatments of densified DWNT fibers when they are conducted in the proper temperature range appropriate to each level of boron doping. The materials resulting from applying the above methods are expected to have very high tensile strength, Young's modulus, bending strength, ultimate breaking strength, toughness, hardness, and high electrical and thermal conductivity as well as other valuable material properties. TEM, SEM and other methods have shown that DWNTs are separated by nanoscale gaps as they are suspended in place by Vander Waals force fields. That is also observed with other nanotube materials and it causes high thermal resistance by reducing convective heat conduction between adjacent nanotubes. Conversely, linking the walls of adjacent MWNTs with ion beam radiation has been shown to decrease thermal impedance and thermal resistivity in MWNT films and nanopaper. While not wanting to be bound by a particular theory it is believed that the materials and methods divulged here will produce DWNT and other carbon nanotube materials linked by fused nanostructures that will bridge the gaps between them and decrease thermal resistivity and increase their utility in heat sinks used to cool electronics including LEDs, integrated circuit chips, solar cell arrays, refrigeration equipment, HVAC equipment, motor vehicle radiators, and other uses. The presently divulged invention will also provide refractory materials for high temperature applications with increased thermal conductivity and heat radiative properties.

Defluorination of Fluorinated Carbon Nanoparticles

Spark plasma sintering (SPS) of fluorinated MWNT compressed at 80 MPa (5.8 Tons) and 1000° C. resulted in carbon materials with approximately three times the fracture bending strength and approximately twice the young's modulus of commercial graphite, and the materials also had high electrical and thermal conductivity. The compressed semialigned materials showed high anisotropy of electrical conducton of 15 to 30 times, similar to HOPG. Fluorinated carbon nanotubes in those starting materials have large numbers of fluorine atoms sticking out from their surfaces. When they are compressed and subjected to thermal decomposition they become linked together with a high density of covalent SP3 carbon-carbon bonds between the nanotubes (Sato 2008). Experiments in the published scientific and technical literature show that other means of defluorinating them such as heating with hydrazine at lower temperatures do not result in highly interlinked materials of that type. Although the SPS process was shown to link defluorinated MWNT carbon nanotubes with each other into high strength, high conductivity carbon materials, MWNT carbon nanotubes are expensive and it will be desirable to use less costly starting materials to manufacture similar materials. SPS processing is expensive and limited to small articles of manufacture also.

Referring to FIG. 6, highly fluorinated graphene also termed fluorographene is shown. Fluorine atoms are attached to the graphene sheet and project from below the nanosheet plane 27a and above the graphene nanosheet plane 27b. The graphene sheet itself is composed of in-plane carbon atoms 29. An in plane SP2 bond 31 between two carbon atoms is shown.

Referring to FIG. 7, 4 layers of graphene nanosheets are shown stacked on top of each other. Multiple layers of fluorinated graphene nanosheets shown in FIG. 6 become linked by SP3 bonds if they are placed in contact with each other and heated to decomposition temperature. An SP2 covalent bond linking two carbon atoms in the plane of the bottom graphene nanosheet 31b is characteristic of unmodified graphite and nanosheets in multi-layered graphene. Carbon atoms bonded by SP2 bonds have 3 attached groups—all in the same graphene plane. Carbon atoms bonded by SP3 bonds have 4 attached groups 35. Solid black lines 33 and 33a symbolize SP3 covalent bonds, each linking a carbon atom in the bottom graphene layer with a carbon atom in the layer of the graphene nanosheet directly above it. Thus, the bottom two graphene nanosheets are shown linked by two vertically oriented SP3 bonds. In a real, bulk material made by the fluorination—defluorination process, dense assemblages with large numbers of SP3 bonds will link graphene layers above and below each other creating a much harder, stiffer material with high tensile strength. Van der Waals bonds let the layers of graphene in graphite slip past each other. Adding SP3 bonds will prevent slippage and increase strength. Other halogen elements include chlorine, bromine and iodine and they can be reacted with graphene or other carbon nanoparticles and thermally dehalogenating them will also result in SP3 interlinked nanoparticle materials if they are simultaneously densified before and during the thermal decomposition reactions. Those embodiments are claimed in this disclosure.

Some preferred embodiments divulged here substitute fluorinated graphene nanosheets as starting material for SPS processing under substantially the same conditions as fluorinated MWNTs were, (Sato 2008) although other embodiments employing altered processing conditions might be useful also. Graphene nanosheets are currently sold at a price ten times less than carbon nanotubes since they can be manufactured by the hummers method and other processes that require much lower energy inputs than carbon nanotube manufacture. They are also synthesized without expensive catalysts and their manufacture does not require costly controlled atmosphere conditions. Fluorinated graphene is produced by a number of methods and highly fluorinated graphene oxide has been produced by simple cheap aqueous methods (Mathkar 2013) and US 2013/0237723 A1.

The high strength materials made with fluorinated MWNT starting materials subjected to SPS derived their increased strength from the large number of SP3 covalent bonds linking the nanotubes. Those linkages were formed at the surface of those MWNTs. While not wanting to be limited by theory it is believed that the higher surface area of fluorinated graphene nanosheets and the geometrical placement of those nanosheets will produce a much larger number and density of SP3 interlinkages in densified defluorinated graphene materials and that those materials will be stronger than materials manufactured by defluorinating MWNT carbon nanotubes.

Other embodiments of the present invention use fluorinated carbon nanotubes in combination with fluorinated graphene as the starting material and subject those powders to substantially the same conditions as the fluorinated MWNTs detailed above. Of course it is possible that varying those conditions will result in materials with valuable properties. While not wanting to be bound by a particular theory it is believed that increasing the pressure during SPS manufacturing might increase the strength of those materials while much higher pressures will break down the carbon nanotube walls and lower their final strength. Other embodiments might use fluorinated nested fullerenes as starting material and still other embodiments can mix those nanoparticles with fluorinated carbon nanotubes or other fluorinated carbon nanoparticles.

Record breaking toughness resulted from combining carbon nanotubes and reduced graphene oxide flakes in solution-spun polyallylamine (PAA) polymer fibres. Their gravimetric toughness approaches 1,000 J g-1, greatly exceeding spider dragline silk (165 J g-1) and Kevlar (78 J g-1). That toughness enhancement is consistent with the observed formation of an interconnected network of partially aligned reduced graphene oxide flakes and carbon nanotubes during solution spinning, which act to deflect cracks and allow energy consuming polymer deformation. Toughness was dependent on the volume ratio of the reduced graphene oxide flakes to the carbon nanotubes in the spinning solution—(equal amounts by weight of carbon nanotubes mixed with graphene oxide nanosheets in 70% wt. PAA was optimum) The hybrid fibres were sewable and weavable, and could be shaped into high-modulus helical springs. (Lee 2012) It was also discovered that removing the polymer from those fibers reduced their toughness by a factor of four which still makes them approximately 3 times tougher than kevlar.

An embodiment of the invention divulged in this patent application will use a variety of fluorination methods including but not limited to, heating in fluorine gas to fluorinate the MWNTs and the graphene nanosheets in the supertough fibers detailed above, after the aligning polymer molecules are removed by thermal evaporation. The fluorinated carbon nanotubes and graphene nanosheets in 50:50 ratios are aligned for optimum toughness and they are kept in close contact enabling their interlinkage in thermal defluorination reactions. While not wanting to be bound by a particular theory it is believed that dense SP3 interlinkages of the aligned MWNT carbon nanotube-graphene nanosheet fibers will increase their tensile strength, bending strength, hardness, young's modulus, and toughness. Embodiments that employ processing conditions that preserve the aligned nanostructures of those fibers will provide supertough macroscopic fibers. The resulting fibers will be useful in all applications that can take advantage of super tough, thermally conductive fibers such as woven bullet proof vests, blast proof tents, and polymer matrix composites suitable to use in golf clubs, wind turbine blades, rotoblade atherectomy apparatus, and aerospace applications.

Alternative embodiments will use electron beams to interlink nonfluorinated fibers manufactured by removing the PAA (polyallylamine) polymer matrix from synergistically toughened carbon nanotube graphene oxide fibers as detailed above. The fibers can be woven into sheets that will be passed through electron beams to weld the nanoparticles composing them together with apparatus shown in FIG. 11 They too will be very tough and have other material properties in common with the defluorinated MWNT—graphene oxide fibers. They will have higher electrical conductivity than SP3 bonded nanoparticle fibers manufactured by thermal dehalogenation. Other fibers such as DWNT fibers, MWNT fibers and carbide fibers can also be woven into cloth that is processed by the apparatus shown in FIG. 11.

There is a wide variety of other carbon nanoparticles that can be fluorinated and then processed according to the methods divulged here—densification of fluorinated nanoparticles followed by thermal defluorination. All of the thermal defluorination methods change the SP2 carbon bonds found in carbon nanotubes and graphene materials to SP3 bonded carbons as shown in FIG. 6 and FIG. 7. Diamond and diamond like carbon possess SP3 bonds. Endowing the materials divulged here with SP3 carbon-carbon bonds will increase their hardness and chemical inertness.

Referring to FIG. 11, a roll to roll apparatus used to make interlinked nanoparticle paper is illustrated. One of the disclosed embodiments manufactures interlinked carbon nanoparticle nanopaper from fluorinated carbon nanoparticles as the starting material. Fluorinated graphene nanopaper has been synthesized and found to have appropriately ⅓ the strength of regular graphene nanopaper. The nanopaper irradiation apparatus shown in FIG. 11 can employ lasers to heat fluorinated graphene nanopaper to 1000° C. to thermally defluorinate it. The defluorination process that was used to manufacture interlinked carbon nanotube materials with SPS apparatus heated the material to that temperature to defluorinate it. In this embodiment roller pressing is used to densify the fluorinated nanosheets prior to laser heating and defluorination. Fluorinated graphene decomposes to graphene beginning at 400° C. and it is possible that temperatures that low will be sufficient to link graphene nanosheets together. It should be noted that the VAAS nanopaper process produces densified nanomaterial by itself, but feeding that nanopaper through roller press apparatus 82 and 83 shown in FIG. 11, will further densify it and further increase its' valuable material properties in combination with the VAAS densification methods disclosed here. Laser heating can also be used to defluorinate and interlink mixtures of fluorinated graphene nanosheets and fluorinated carbon nanotubes in other embodiments or other fluorinated nanoparticles densified by vacuum assisted assembly or other nanopaper processes. Useful materials and articles might also be manufactured by dehalogenating densified halogenated nanoparticles where fluorine has been replaced by other halogen elements. If heated rollers are maintained at decomposition temperature or higher, they can simultaneously defluorinate and densify halogenated nanoparticle paper passed through them in alternative embodiments.

Interlinked Carbide Nanomaterials

FIG. 3 shows a TEM of a MWNT 13 carbon nanotube with 14 boron carbide nanolumps attached along its length. It was synthesized by mixing magnesium diboride nanoparticles with MWNT and reacting them with the MWNT. One of the nanolumps 11 is shown to have fused with the MWNT walls into smoothly welded structures with many covalent bonds. Referring to FIG. 4 the basic principle of the carbide nanoparticle linker is shown. Boron carbide nanolumps 13a and 13b are shown projecting from the top MWNT carbon nanotube of an array of six aligned MWNT welded together after the material has been compressed to densify it, and heated to reaction temperature. The six MWNT are shown interlinked by 25 boron carbide nanolumps fused between the MWNTs above and below them. A boron carbide nanolump fused between 2 carbon nanotubes 15 is shown to provide a covalently bonded interlinkage. An unreacted magnesium diboride nanoparticle 17 is one of the starting materials used to manufacture carbon nanotube materials interlinked by boron carbide nanolumps. Other embodiments of the invention will use other carbide-forming nanoparticles as nanoparticle linkers to weld carbon nanotubes together with fused structures. Magnesium diboride nanoparticles can be replaced with silicon nanoparticle linkers of the same size as an example, and heat treatment at proper reaction temperatures will result in an interlinked material comprising carbide fused nanostructures connecting the carbon nanotubes 13a and 13b and linking them to each other.

Referring to FIG. 8, it shows the boron carbide welded MWNT material containing the 25 nanolump nanoparticle linkers shown in FIG. 4 after additional CVD processing that fills the porous material with silicon. The silicon embedded material is subsequently heated to reaction bonding temperature (approximately 1800° C.°) yielding a silicon carbide matrix fused to the walls of the multiwalled carbon nanotubes. Its is depicted as partially penetrating and transforming the walls of the MWNTs with silicon carbide. A space between 2 MWNT filled with a roughly rectangular silicon carbide nanoparticle linker 30 is shown. The boron carbide nanoparticle linker 15 fused between the MWNTs is now surrounded by flanking silicon carbide domains that provide additional linkage between the carbon nanotubes. The second nanoparticle linker 30 is depicted as a rectangular box filled with vertical grey lines. It increases the stiffness and compressive strength of the material. The intercalated silicon carbide domains are approximately the same width as the MWNT and function as silicon carbide nanoparticle linkers that weld the carbon nanotubes to each other with many more bonds per unit surface area and unit volume of the nanoparticles than conventional chemical linkers.

The prior art patent "Covalently Bonded Graphene Coating and its Applications Thereof," WO 2014004514 A1 and PCT/US2013/047627 relates to production of covalently-bonded graphene coating on various solid substrates using a combination of graphene, graphene oxide or graphite and a silicon compound material with or without metal containing compounds. It specifies processing of those compounds and materials at temperatures ranging from 750° C. to 1200° C., preferably from 850° C. to 1000° C. All embodiments of the present invention process mixtures of carbide-forming nanoparticles and carbon nanoparticles at higher temperatures than the prior art patent specifies. For example, reaction bonded silicon carbide is commonly synthesized at 1800° C. and the reaction of boron with carbon takes place at ~2760° C. Those would be the processing temperatures of those two materials respectively. The different and higher processing temperatures will endow the materials of present invention with higher strength than those in PCT/US2013/047627. In addition to providing covalent bonds linking the edges of the graphene nanosheets or carbon nanotubes or other carbon nanoparticles, the rest of those carbon nanoparticles' surfaces will be welded to the adjacent carbide-forming nanoparticles contacting them.

It should be noted that the size of the carbide-forming linking nanoparticles in the materials of the present invention should be approximately the same size in at least one dimension of the carbon nanoparticles that they are designed to link together. The added silicon carbide nanoparticles shown in FIG. 8 are approximately the same size as the diameters of the carbon nanotubes. There is little or no unreacted silicon remaining in the linking silicon carbide nanoparticles that can weaken the nanostructure. Silicon has much lower strength parameters than silicon carbide and carbon nanotubes; the rule of thumb provided above ensures that very little of the weaker silicon will remain in the densified ceramic nanomaterial. The same holds true of the calcium carbonate "bricks" and protein glue that cements mollusk shell nacre together. The "brick and mortar" nanostructure of that material is noted for having much higher toughness than either of its constituent components. In contrast to the "brick and mortar" structure of nacre, the nanoparticles of the present invention are welded together by fused nanostructures that will endow them with even greater strength gains than those natural nanostructured materials. In general the rule of thumb provides that the smallest dimension of the carbon nanoparticles should be substantially the same size as the smallest dimension of the carbide forming nanoparticles to form the "brick and mortar" structures discussed above. Examples illustrating the principle are shown in FIG. 4 and FIG. 8.

Interlinked Nanoparticle Nanopaper Processes

Referring again to FIG. 11, apparatus useful to manufacture a number of different types of interlinked carbon nanoparticle nanopaper is shown. Nanopaper 79 manufactured by VAAS, or spraying, electrolytic deposition on removable substrates, or other processes (not shown) can be processed to cause interlinkages between constituent nanoparticles. The nanopaper can be irradiated by an irradiation source 86 which projects electron beams in embodiments where electron beam heating causes interlinkages including DWNT and boron doped DWNT nanopaper or other embodiments using electron beam welding to interlink MWNT or SWNT nanopaper or nanopapers containing combinations of nanoparticles such as silicon nanowires and graphene nanosheets.

Other embodiments employing lasers as irradiation sources 86 in place of electron beams can heat DWNT nanopaper to temperatures sufficient to cause fusion of the double walled nanotubes comprising the nanopaper (between appropriately 2100° C. to 2500° C.) or a lower temperature range (approximately 1500° C. to 2150° C.) will fuse DWNTs doped with proper amounts of boron. Other temperatures and times of heating and other conditions might also be useful for manufacturing high strength DWNT nanopaper.

One alternative embodiment will use electrical resistance heating. Electric currents passed between roller electrodes 83 and 85 weld MWNTs in the nanopaper together, resulting in increased conductivity nanopaper. A nanoscopic view of that welding process is shown in FIG. 10. A direct current can be passed through the electrodes in some embodiments. In one embodiment the electrodes are spaced 0.5 cm apart and 1 amp is passed through them (2 amp/cm) for a period of one minute. The rollers 82 and 83 also serve to densify the various carbon nanoparticles and or carbon nanoparticles mixed together in combination with carbide-forming nanoparticles. The paper is advanced and heated by electrical resistance heating in a large scale process that produces continuous rolls of high conductivity, high strength nanopaper.

A different alternative embodiment operates by switching off electrode 85 and passes an electric current between the top and bottom of the sheets of nanopaper utilizing bottom positive roller electrode 82 and top negative roller-electrode 83 to cause the constituent nanotubes to weld together. The length of time and the amount of current necessary to weld the nanotubes in the nanopaper together will be different and generally smaller, reflecting the smaller distance between electrodes 82 and 83 (appropriately 5 to 100 microns) and the smaller amount of electricity necessary to achieve the same temperature and or current density. Of course the speed of advancing the nanopaper will also be a factor determining the current, voltage, pulse length and temperature of processing.

Yet other embodiments employing alternating currents or electric currents with shaped pulses might be useful for achieving the goal of creating fused nanostructures between conducting carbon nanoparticles or in mixtures of conducting carbon nanoparticles and carbide-forming nanoparticles in nanopapers and films containing those particles.

Spraying graphene nanosheets at supersonic velocities using Laval nozzle apparatus caused them to flatten out and change structure after they impacted the substrate. Some of the graphene nanosheets did not have perfectly hexagonal structures but contained some heptagonal and pentagonally arranged carbon atom rings. The kinetic energy of impact rearranged those bonds resulting in perfectly hexagonally structured graphene nanosheets. (Kim 2014) Now, Referring to FIG. 9, it shows the apparatus used in a supersonic spray (also called gas dynamic cold spray) process where a supersonic Laval nozzle 55 is used to shoot fluorinated graphene nanosheets at a substrate 59 where the layers are deposited. Thin deposits are formed as films, and thicker deposits will form nanopaper that can be peeled off the substrate 59. Repeated deposition will result in thick plates and other objects. The fluorinated graphene can be dissolved in organic solvents pumped by a syringe pump 57 into a stream of inert gas provided by the compressor 67 and heated by the gas heater 63. The solution evaporates after the heater raises its temperature and dry fluorinated graphene is deposited on the substrate 59. When supersonically accelerated fluorinated graphene impacts the substrates, the kinetic energy of impact will defluorinate it and structural rearrangements will link adjacent nanosheets as well as those in layers above and below them with dense assemblages of SP3 bonds characteristic of diamond like carbon. If fluorinated graphene nanosheets impact at high enough velocities they will become completely defluorinated by heat generated by impact and will create material equivalent to the material of other embodiments in this patent. The fluorinated graphene nano sheet material will be simultaneously densified and heated to thermal decomposition by the gas dynamic cold spray apparatus used in this important embodiment.

Some embodiments of this invention can be used to manufacture thick flat plates and objects of other shapes by prolonged and controlled supersonic spraying of fluorinated graphene onto substrates 59. A controller apparatus controlling the x and y coordinates of the spray deposition process (apparatus not shown) provides a method of accomplishing additive manufacturing of SP3 interlinked nanoparticle graphene objects. Additive manufacturing processes for manufacturing objects comprising nanoparticles linked by carbide bonds and other bonds are discussed in the SUMMARY OF THE INVENTION.

In some embodiments of the present invention SP3 carbon-carbon covalent bonds interlink cold sprayed halogenated graphene nanosheets in films sprayed on substrates 59 as they are deposited layer by layer by supersonic spray nozzle 55. The kinetic energy of impact of nonfluorine halogenated graphene nanoparticles causes thermal decomposition of that material yielding fused carbon nanostructures. In yet other embodiments, other types and mixtures of halogenated (preferably fluorinated) carbon nanoparticles can be spray deposited at supersonic velocities yielding ultra hard, ultra tough noncorrosive films and thicker objects. For example, other embodiments might use fluorinated nested fullerenes as starting material and still other embodiments can mix those nanoparticles with fluorinated carbon nanotubes or other fluorinated carbon nanoparticles.

Supersonic spray deposition apparatus can also manufacture incompletely fluorinated green bodies when lower spray velocities are used. Green bodies of highly fluorinated graphene can be built up by cold spray deposition at even slower subsonic velocities (<600 MPH). Lower spray velocities can be achieved by running the compressor 67 at lower pressure. Fluorinated graphene nanopaper has been synthesized and its tensile strength was measured at ⅓ that of graphene nanopaper made by VAAS suction filtration. It is electrically nonconducting and has the same tribological properties as teflon.

In the embodiments that build up objects such as plates and blocks made of subsonically sprayed fluorinated graphene, thermal processing at the temperature of decomposition of fluorographene (400° C.) and greater will yield high strength interlinked graphene nanosheet materials. Green bodies can be thermally processed in furnaces 118 as shown in FIG. 13.

Thin films and thicker nanopaper composed of densely interlinked graphene can be manufactured by supersonic deposition onto flat substrates 59 or onto teflon, PET or other tapes that have low adhesion such as diamond coated tapes. The nanopaper on tape substrates can be conveyed between rollers (not shown). The graphene paper is subsequently peeled off the low adhesion tape or substrates. In embodiments where incompletely defluorinated, low velocity fluorinated graphene has been spray deposited, the material can be processed in a furnace to thermally defluorinate it.

Yet other embodiments can substitute highly fluorinated oxidized graphene (HFOG) instead of fluorinated graphene in all processes listed above. HFOG contains oxygen atoms as well as fluorine atoms attached to the graphene nanosheets. It is easily deposited by spraying it dissolved in THF (paint thinner.)

In a different embodiment, graphene quantum dots (QD) (~6 nm diameter) and or graphene nanoribbons (GNR) can be sprayed at supersonic velocities at a substrate to build up films and nanopaper consisting of interlinked graphene materials. The same process that causes rearrangements and smoothes the structure of graphene nanosheets will link the dangling bonds at the edges of graphene QDs and GNRs. Dangling bonds on GNRs laid side by side in the same layer will become connected as well as dangling bonds in the nanoparticles in layers above and below them. Aiming the supersonic Laval nozzle at mandrels will enable building up thick layers of interlinked GNR and or graphene QD derived carbon and manufacturing objects having the same shape as the mandrel. That process will not generate toxic fluorine fumes. Fluorinated graphene nanosheets can be sprayed onto mandrels also to deposit and build up shaped objects that are later removed from the mandrel. Supersonically accelerated fluorinated graphene will rearrange its bonds and fuse with the graphene layers below it as the kinetic energy of impact decomposes the nanosheets as they are slammed against each other. It will form the same interlinked molecular nanostructures as fluorinated graphene does after it is thermally decomposed by SPS and hot press apparatus.

The supersonic Laval nozzle process detailed above accelerated graphene nanoparticles at approximately 1000 mph. Supersonic Laval nozzles can be used to accelerate nanoparticles up to approximately 15 times that velocity and those velocities might be sufficient to heat boron doped DWNTs to temperatures that weld them together into ultra tough, ultra strong materials detailed in the this disclosure. According to (Endo 2005), calculations lead to reaction times measured in picoseconds for the nanotubes to fuse into three and four junction structures. That time period is so short that they might become instantly welded together as they impact substrates.

The roll to roll apparatus used to make extended flexible interlinked graphene paper is not shown in FIG. 9. Referring now to FIG. 13 a flowchart for manufacturing the nanomaterials in this patent disclosure is shown. The process starts with block 90 labeled select nanoparticle type. The nanoparticles are selected from one of a number of types—carbon nanoparticles 92, DWNT double walled carbon nanoparticles 94, or fluorinated carbon nanoparticles 98. Some of the materials are composed of mixtures of nanoparticles and the flow chart shows that carbon nanoparticles 92 are mixed with carbide-forming nanoparticles 100 in some embodiments. DWNT can be used as starting materials with or without added boron nanoparticles 98. All nanomaterial manufacturing processes listed in the blocks below include the nanoparticle densifying step 102. Densification can be accomplished by several methods. Electrodeposition 104 uses conducting electrodes immersed in solutions and suspensions containing nanoparticles to be densified. Turning on electric currents causes the nanoparticles to become deposited onto the electrodes and if a sufficient amount of time passes a dense layer will be built up where all of the nanoparticles are contiguous with each other. Electrophoretic deposition is a type of electrodeposition that has been used to deposit nanoparticle films. Some electrodeposition methods can detach deposited films by reversing the current. Cold pressing processes 106 include compaction of nanoparticle powder in die presses or inside cans in the cold isostatic pressing process. In vacuum assisted assembly 108 nanoparticles suspended in solution are filtered in Buchner funnels or with similar equipment until suction removes all of the liquid leaving densified nanoparticles on the filter membrane. Drying steps densify the material further. Fiber extrusion 110 of nanoparticles in suspensions or solutions forces them through a spinneret which densifies and aligns the nanoparticles as they emerge as fibers.

Some fiber extrusion methods extrude the fibers into coagulant liquids that cause the fiber nanoparticles to contract and densify as they come into contact with the liquid. Nanoparticle powders can be loaded into hot press apparatus 112 and compressed at high temperatures. Nanoparticles can also be compressed at high temperatures by hot isostatic pressing inside specially built cans. Spark plasma synthesis apparatus 114 will compress nanoparticle powders while also running high current sparks through the powder which provides energy to break chemical bonds and rearrange them to weld nanoparticles together. Hot press and SPS apparatus will interlink nanoparticles in DWNT powder 94, carbon nanoparticles 92 mixed with carbide forming nanoparticles 100 and fluorinated carbon nanoparticle powders 98. Other densifying methods and apparatus exist but are not shown. Some of the densifying methods—SPS 114, hot pressing 112 and supersonic spray deposition 115 simultaneously supply energy to rearrange bonds and cause interlinkage of nanoparticles in addition to densifying those materials. Other densifying methods do not add energy and it is added at the next stage of the process 116. A number of methods of supplying interlinkage energy to the densified nanoparticle materials are shown. Furnace heat treatment 118 will cause reaction bonding of carbide-forming nanoparticles such as silicon nanowires or boron nanowires when they are mixed with carbon nanoparticles such as MWNTs or graphene nanosheets and densified.

Electron beam apparatus 120 will interlink MWNTs and other carbon nanoparticles and mixtures in thin films and nanopaper. They are limited by the depth that the electrons can penetrate them. If thin layers of nanopaper or films are placed on top of each other the electron beams can penetrate multiple layers and bond them together into laminated composites, one layer at a time. Carbon nanoparticles can also be used as feedstock for additive manufacturing processes where powder is compacted by rollers (not shown) and it can be selectively sintered by electron beams 120. The remaining unsintered carbon nanopowders are later removed leaving rapid prototyped, custom made objects. Ion beams 122 can be used to manufacture nanopaper and laminated nanopaper materials and to selectively sinter nanopowders for additive manufacturing in a similar way. The nanopowders can be densified by roller pressing or by other methods not detailed or shown here. Densified green bodies made of fluorinated carbon nanoparticles can be heat treated in vacuum furnaces 118 or in inert atmosphere furnaces 118. Unfinished fluorinated carbon nanoparticle nanopaper sheets or rolls can be heat treated in furnaces 118 to weld their nanoparticles together, thereby increasing their strength and interparticle connectivity. A means of separating the nanopaper sheets in the rolls is recommended to prevent sticking. The interlinkage process that welds fluorinated carbon nanoparticles together takes place when they are defluorinated by thermal means. The volume of nanopaper that can be treated by rolling it all up before placing it into a furnace is much bigger than if the sheets were treated one at a time. Besides furnace heat treatment 118, they can be defluorinated by laser beam heating 124. Laser beam apparatus can be combined with selective laser sintering apparatus (not shown) to manufacture interlinked carbon nanoparticle objects as part of a rapid prototyping process, also known as additive manufacturing. Selective laser sintering rapid prototyping apparatus uses rollers to pack down powder that is selectively sintered into patterns that define objects. Unsintered nanopowder will be brushed off the objects or otherwise removed. Since thermal defluorination will release fluorine gas it will be necessary to provide means of toxic fume decontamination. (Means not shown.) Capacitive discharge sintering 126 is an alternative method of linking nanoparticles together. It does not provide high pressure compaction. Thus objects that have already been densified are placed between the conducting plates of a CDC. Like SPS, it heats and supplies energy for linking nanoparticles via high current pulses of electricity. CDS employs much shorter higher energy pulses than SPS and sinters green bodies in a matter of seconds. It can also sinter and bond nanopaper composed of carbon nanoparticles 92 mixed with carbide forming nanoparticles 100, DWNT 94 or DWNT mixed with boron nanoparticles 96 as well as nanopaper made with fluorinated carbon nanopowders 98.

Bonding Nanopaper Laminates

The molecular nanostrutures of some materials in several embodiments of the invention enable parts composed of them to be bonded together. For example nanopaper made from mixtures of carbon nanotubes and silicon nanoparticles can be placed in an additive manufacturing device for squeezing it together with other sheets of the same material (not shown) and silicon domains will contact unreacted carbon domains of a contacting sheet and they can be reaction bonded at the proper temperature—1700° C.-1800° C.

The nanoparticles and starting materials of the present invention all contain large amounts of carbon nanoparticles. Most of the preferred embodiments employ highly graphitic nanoparticles such as carbon nanotubes and graphene nanosheets. They adhere to each other by VdW attraction and they can be compressed into laminated and cut nanopaper by LOM additive manufacturing apparatus. Nanopaper sheets made from mixtures of carbide-forming nanoparticles such as silicon nanowires and graphitic carbons nanoparticles will also stick together under pressure. That will enable laminated nanopaper green body production from those nanoparticles, which can be used as starting material for manufacturing LOM objects.

Referring to FIG. 13, in embodiments where green bodies composed of DWNTs 94 are placed into contact under pressure, heating them in a furnace 118 or hot press 112 to the temperature of fusion of the outer DWNT walls will create high strength welds between the two objects. Both boron doped 96 and undoped DWNT 94 laminated nanopaper green bodies can be bonded, but at different temperatures.

Laminated object manufacturing (LOM) is a system where plastic, or metal laminates are successively glued together and cut to shape with a knife or with laser beams. In embodiments of the present invention; thin strips and sheets of carbon nanotube and other types of carbon nanoparticle paper can bonded to each other with electron beams 120 and ion beams 122 to manufacture laminated objects; layer-by layer. Those beams do not penetrate deeply and it will be necessary to bond nanoparticle paper sheets one at a time or a few at a time. There is no limit to the penetration of heat into stacked sheets of fluorinated graphene or other fluorinated carbon nanoparticle nanopapers and thick stacks of those types of materials can be hot pressed 112 into high strength laminated composites in a short amount of time. Thick stacks of DWNT nanopaper 94 and boron doped DWNT nanopaper 96 can also be heat treated to bond them into high strength laminated composites including LOM embodiments in situ with laser beams as well as with externally situated furnace and vacuum press equipment. Electron beams and ion beams can weld small spots in selected places in other embodiments as well as completely bonding DWNT sheets in laminates to each other.

Capacitive discharge sintering (CDS) apparatus 126 uses short very high current electrical pulses to bond ceramic particles together. It can bond nanopaper sheets of carbide-forming nanoparticles mixed with carbon nanoparticles to manufacture high strength electrically conductive transition metal carbide laminates as well as nonconducting silicon carbide laminated composites. CDS can also be used to manufacture laminated composites from electrically insulating fluorinated carbon nanoparticle 98 paper. It cannot be employed to selectively sinter parts of objects but it can build up thicker laminated nanopaper and LOM objects.

At the bottom of the flowchart, the finished article 130 can be a sheet of nanopaper, a laminated composite formed from a plurality of sheets of nanopaper, a block formed from pressed and sintered nanopowder, extruded fibers, or selectively laser sintered objects or objects selectively sintered by e-beams or ion beams. Other manufacturing methods such as supersonically sprayed 115 fluorinated carbon and selected supersonically sprayed 115 carbon nanoparticles are shown in FIG. 13 and are detailed in discussions of FIG. 9. Subsonically spray deposited nanopaper and objects made of fluorinated carbon nanoparticles 98 can be processed in the same ways and by the same apparatus as objects of that composition made by processes shown in FIG. 13. Like SPS 114 and hot pressing 112, supersonic spray deposition FIG. 9 densifies and imparts interlinking energy simultaneously.

CONCLUSIONS RAMIFICATIONS AND SCOPE

While the above description contains many specificities, these should not be construed as limitations on the scope, but as exemplifications of some present embodiments. Many other ramifications and variations are possible within the teachings. Thus the scope should be determined by the appended claims and their legal equivalents, and not by the examples given. For example, the interlinked nanomaterials methods expounded here may be applied, with certain advantages to many other types of halogenated carbon nanoparticles, carbon nanoparticles and nanoparticles of carbide-forming elements with the advantages of manufacturing very high strength objects, fibers for composite materials, lightweight electrical cables, nanopaper, laminates and the nanoparticles detailed in this disclosure can also be used in additive manufacturing processes that utilize the methods developed here in combination with selective laser sintering and e-beam sintering rapid prototyping and laminated object manufacturing. A ramification of the use of densified pure nanoparticles without binders is that the methods disclosed here will produce very finely grained high strength materials.

OBJECTS AND ADVANTAGES

1.) An object of the invention is to increase the electrical and thermal conductivity of carbon nanoparticle films, coatings, nanopaper, fibers and objects.

2.) An advantage of the present invention is that carbon-carbon and carbon-metal bonds in fused nanostrutures bridge the gaps between carbon and conducting carbide nanoparticles respectively, and lower electrical and thermal impedance and contact resistance.

3.) An object of the present invention is to manufacture very fine grained nano composites with much greater strength than non-nanograined materials.

4.) An advantage of the present invention is that it uses nanoparticles without binders as a starting material to manufacture extremely finely nanograined materials.

5.) An object of the present invention is higher strength nanopaper that can be bonded without binders into increased strength laminated composites.

6.) An advantage of the present invention is that it provides methods and apparatus for manufacturing increased strength laminated composites without binders by bonding nanopaper with electron beams, ion beams, SPS, CDS, laser beams and thermal energy.

7.) An object of the present invention is to use rapid prototyping methods and apparatus to create rapid prototyped articles with the benefits of the materials disclosed here.

8.) An advantage of the present invention is that it provides starting materials for additive manufacturing of rapidly prototyped objects, including additives for selective laser sintering and laminated object manufacturing (LOM).

9.) An advantage of DWNT, boron doped DWNT, fluorinated carbon nanoparticles, and mixtures of carbon nanoparticles and carbide-forming nanoparticle starting materials, is that thermal energy can weld and interlink those nanoparticles in furnaces and hot presses and they can manufacture thick extended objects as opposed to e-beam and ion beam sintering processes that use packed powder, thin films and nanopaper exclusively.

10.) An advantage of the nanostructured carbide materials is that they will not be flammable and the other carbon nanomaterials will have high heat conduction and heat radiation proprieties making them flame retardant. Their lack of organic polymer binders will also contribute to lack of flammability as well as preventing release of toxic fumes.

11.) An advantage of the present disclosed materials is that they will be resistant to organic solvents that dissolve polymer binders making them suitable in chemical processing and laboratory equipment.

12.) An advantage of the present invention is that organic polymer binders are replaced with inorganic nanoparticles with higher binding and that those inorganic nanoparticle linkers are not subject to oxidative or corrosive damage.

13.) An advantage of the present invention is that the disclosed materials will possess very low porosity which will limit corrosion and they will possess other advantages where low porosity carbides and carbon materials are desirable.

14.) An object of the present invention is manufacture of coatings, films, nanopaper, laminates, and objects from fluorinated carbon nanoparticles, and fluorinated graphene nanosheets in particular in some preferred embodiments. Other objects are use of other halogenated carbon nanoparticles as feedstock for those manufacturing processes.

15.) An advantage of the supersonically sprayed fluorinated graphene method of depositing graphene is that it will simultaneously densify and thermally defluorinate fluorinated graphene nanosheets by releasing kinetic energy of impact at the site of fluorinated nanoparticle deposition. A further advantage is that the disclosed embodiment provides a simple method of manufacturing high strength interlinked graphene coatings nanopaper, films, and bulk objects.

16.) An advantage of the sprayed fluorinated graphene method is that lower speed impacts will leave partially defluorinated graphene coatings, films, nanopaper and objects with valuable tribological, hydrophobic, dielectric and other properties such as inertness to chemical reactions.

17.) An advantage of the supersonic spraying method for depositing graphene nanoribbons and or graphene quantum dots is that it will simultaneously densify the materials and that kinetic energy of impact will rearrange and interlink their nanostructures. A further advantage is that the disclosed method and apparatus provide a simple method of manufacturing high strength graphenoid carbon coatings nanopaper, films, and bulk objects. Another advantage is that those manufacturing methods will not release toxic fumes as fluorinated carbon starting materials will.

18.) An advantage of the present invention is that increased strength refractory materials and articles can be manufactured, including gas turbine blades and parts, and wind power turbine parts.

19.) An advantage of the present invention is that increased strength, increased conductivity, lower weight and smaller volume electrical cables can be manufactured by interlinking carbon nanotube starting materials.

20.) An advantage of the present invention is that dense interlinkages and fused nanostructures preserve the strength of double walled carbon nanotubes by seamlessly welding the nanotube walls together. Boron carbide nanolumps also are seamlessly welded to MWNT carbon nanotubes and an advantage of the methods divulged here is that carbide-forming nanoparticles can be used as linking nanoparticles to weld ultra high strength nanoparticles together. Prior art methods bond nanotubes to each other with much lower densities of covalent bonds per unit surface area and per unit volume of the nanoparticles being linked.

21.) An advantage of the present invention over the prior art is that using pure nanoparticles for the starting materials before densifying ensures there will be maximum strength in the product. The product will also have a more finely grained structure than prior art materials containing binders and other starting materials.

The invention claimed is:

1. A method of manufacturing bulk objects consisting of nanoparticles comprising,
   a, providing a starting material comprising nanoparticles selected from the group consisting of,
      i, double walled carbon nanotubes,
      ii, double walled carbon nanotubes in combination with boron,
      iii, halogenated carbon nanoparticles,
      iv, carbide-forming nanoparticles in combination with carbon nanoparticles
      v, carbide-forming nanoparticles formed from carbide-forming elements supplied in the liquid or in gaseous phase in combination with carbon nanoparticles, and
   b, wherein said nanoparticles have an ability to covalently bond to each other,
   c, said starting material being free from binders, polymers, organic polymers, polymer binders and polymer matrixes,
   d, densifying said starting material, using suitable means and apparatus to place all nanoparticles into contact with adjacent nanoparticles,
   e, adding energy to said starting material using suitable means and apparatus, to cause formation of covalent bonds between adjacent nanoparticles in said starting material, wherein the steps d and e can be performed as two separate steps or as a single step for forming covalent bonds between adjacent nanoparticles, wherein said object is comprised of nanoparticles that substantially retain size, shape and graphitic wall structure after densification and addition of energy,
   f, where if the starting material comprises double walled carbon nanotubes, said covalent bonds are formed from the coalescence of graphene sheets that comprise outer walls of adjacent nanotubes to form a single outer wall between the nanotubes.

2. A method of claim 1 wherein starting materials are selected from the group consisting of,
   a, carbon nanoparticles selected from the group consisting of single walled carbon nanotubes, double walled carbon nanotubes, double walled carbon nanotube bundles, double walled carbon nanotube fibers, multi-walled carbon nanotubes, carbon nanotube bundles, carbon nanofibrils, nested fullerenes, fullerenes, graphene nanosheets, multilayered graphene, few layer graphene nanosheets, graphene nanoribbons, graphene quantum dots, and graphitic carbon nanoparticles,
   b. halogenated carbon nanoparticles selected from the group consisting of halogenated graphene nanosheets, multiple layer fluorinated graphene nanosheets, fluorinated graphene nanosheets, highly fluorinated oxidized graphene, fluorinated multiwalled carbon nanotubes, fluorinated carbon nanotubes, fluorinated nested fullerenes,
   c, carbide-forming nanoparticles selected from the group consisting of silicon nanoparticles, silicon nanowires, magnesium diboride nanoparticles, boron nanoparticles, boron nanowires, boron nanoplatelets, iron nanoparticles, nickel nanoparticles, titanium nanoparticles, tungsten nanoparticles, other nanoparticles of transition metal carbide forming elements, other metal containing nanoparticles, all other carbide forming element containing nanoparticles capable of undergoing carbide-forming reactions with carbon,
   d, carbide-forming nanoparticles formed from carbide-forming elements supplied in liquid and in gaseous phase.

3. A method of claim 1 wherein,
a, a starting material selected from the group consisting of,
   i, double walled carbon nanotubes,
   ii, a combination of double walled carbon nanotubes and boron,
b, wherein when the starting material is double walled carbon nanotubes, heating said starting material to a temperature ranging from 2100° C.-2500° C. in a vacuum or inert atmosphere or, wherein when the starting material is a combination of double walled carbon nanotubes and boron, heating said starting material to a temperature ranging from 1500° C.-2150° C., in a vacuum or inert atmosphere.

4. A method of claim 1 wherein,
a, a starting material consisting of double walled carbon nanotubes is provided, or,
b, a starting material consisting of double walled carbon nanotubes in combination with boron, is provided,
c, said starting materials are densified by suitable means and apparatus to form objects including, carbon nanotube nanopaper, nanopaper laminates, coatings, ribbons, and fibers,
d, suitable means and apparatus are provided for irradiating said objects in a vacuum or an inert atmosphere, with electron beams, ion beams, and laser beams, to cause covalent bond formation between adjacent double walled carbon nanotubes.

5. A method of claim 1 comprising,
a, starting materials selected from the group consisting of,
   i, one species of carbon nanoparticle in combination with one species of carbide forming nanoparticle, said carbide-forming nanoparticles having at least one dimension substantially the same size as at least one dimension of said carbon nanoparticles,
   ii, one species of carbon nanoparticle wherein the carbon nanoparticle is a carbon nanotube in combination with one species of carbide-forming nanoparticle, said carbide forming nanoparticle having at least one dimension approximately the same size as the diameter of said carbon nanotubes,
b, mixing said starting materials, using suitable means and apparatus,
c, densifying said starting materials, using suitable means and apparatus,
d, adding energy, to said starting materials in a vacuum or an inert atmosphere, to cause formation of covalent bonds between adjacent nanoparticles in said starting material, using suitable means and apparatus, wherein the steps c and d can be performed as two separate steps or as a single step in the same apparatus.

6. A method of claim 5 comprising,
a, providing a starting material consisting of carbide-forming nanoparticle wherein said nanoparticles are boron nanoplatelets and providing a second starting material consisting of carbon nanoparticles wherein said carbon nanoparticles are multiple layer graphene nanosheets and wherein said nanoplatelets and said nanosheets have approximately the same width,
b, mixing said starting materials using suitable means and apparatus,
c, mixed starting materials are formed into nanopaper using suitable means and apparatus,
d, densifying and heating said nanopaper in an inert gas or vacuum using a hot press to a temperature approximately equal to, or above 2763° C. to cause formation of covalent bonds between nanosheets and adjacent nanoplatelets,
e, densifying and heating said nanopaper in an inert gas or vacuum using a spark plasma sintering apparatus to a temperature approximately equal to, or above 2763° C. to cause formation of covalent bonds between said nanosheets and said adjacent nanoplatelets wherein steps d and e can be used in the alternative or in combination with each other.

7. A method of claim 1 comprising,
a, selecting a starting material consisting of carbon nanoparticles,
b, densifying said carbon nanoparticles using suitable means and apparatus to form a material with spaces between adjacent carbon nanoparticles substantially the same size as said carbon nanoparticles,
c, filling said spaces between adjacent carbon nanoparticles with carbide-forming nanoparticles, by suitable means and apparatus comprising, chemical vapor deposition, physical vapor deposition, plasma vapor deposition, and further infiltrating with carbide-forming elements in a gas or liquid form,
d, adding energy to cause decomposition of said gas or liquid, forming carbide-forming nanoparticles, using suitable means and apparatus, and further densifying, and adding energy to cause covalent bond formation between adjacent carbide-forming nanoparticles and carbon nanoparticles, wherein, steps c and d can take place in the same apparatus.

8. A method of claim 7 comprising,
a, providing a starting material of carbon nanoparticles consisting of multiwalled carbon nanotubes formed into nanopaper using suitable means and apparatus,
b, infiltrating said nanopaper with a carbide-forming element comprising trichlorosilane gas or liquid, using suitable means and apparatus,
c, densifying and heating said nanotube paper infiltrated with said trichlorosilane to above the temperature of decomposition of said trichlorosilane in a hot press to form carbide-forming nanoparticles comprising silicon nanoparticles,
d, removing chlorine gas decomposition product, from the resulting silicon nanoparticle infiltrated nanotube paper using suitable means and apparatus,
e, densifying and heating said silicon nanoparticle infiltrated carbon nanotube paper in a hot press, to a temperature of 1700° C.-1800° C. for a period ranging from one to two hours to cause formation of covalent silicon carbide bonds between adjacent silicon nanoparticles and multiwalled carbon nanotubes,
f, densifying and heating said silicon nanoparticle infiltrated carbon nanotube paper in a spark plasma synthesis apparatus to a temperature of 1700° C.-1800° C. to cause formation of covalent silicon carbide bonds between adjacent silicon nanoparticles and multiwalled carbon nanotubes wherein steps e and f can be used in the alternative or in combination with each other.

9. A method of claim 7 comprising,
a, providing a starting material of carbon nanoparticles consisting of multiple layer graphene nanoparticles formed into nanopaper using suitable means and apparatus, wherein said nanopaper has spaces between adjacent nanoparticles with substantially the same size as the width of said carbon nanoparticles, b, infiltrating said nanopaper with a carbide-forming element comprising trichlorosilane gas or fluid using suitable means and apparatus, c, densifying said nanopaper using suitable means and apparatus, d, heating said nanopaper infiltrated with said trichlorosilane to above the temperature of decomposition of said trichlorosilane in a hot press or a spark plasma sintering apparatus to form carbide-forming nanoparticles comprising silicon nanoparticles, e, removing the chlorine gas decomposition product from the resulting silicon nanoparticle infiltrated nanopaper using suitable means and apparatus, f, densifying and heating said silicon nanoparticle infiltrated nanopaper in a hot press to a temperature of 1700° C.-1800° C. for a period ranging from one to two hours to cause formation of covalent silicon carbide bonds between adjacent silicon nanoparticles and multiple layer graphene nanoparticles, g, densifying and heating said silicon nanoparticle infiltrated nanopaper in a spark plasma sintering apparatus to a temperature of 1700° C.-1800° C. to cause formation of covalent silicon carbide bonds between adjacent silicon nanoparticles and multiple layer graphene nanoparticles wherein steps f and g can be used in the alternative or in combination with each other.

10. A method of claim 1 comprising, a, providing a halogenated carbon nanoparticle starting material selected from the group consisting of,
  i, brominated carbon nanoparticles,
  ii, chlorinated carbon nanoparticles,
  iii, fluorinated multiwalled carbon nanotubes in combination with fluorinated carbon nanoparticles that are not fluorinated multiwalled carbon nanotubes,
  iv, fluorinated carbon nanoparticles singly, or in combination with other species of fluorinated nanoparticles not including fluorinated multiwalled carbon nanotubes, but including multiple layer fluorinated graphene nanosheets, fluorinated graphene nanosheets, highly fluorinated oxidized graphene, fluorinated carbon nanotubes, and fluorinated nested fullerenes,
  v. iodinated carbon nanoparticles, b, mixing said starting materials, using suitable means and apparatus, c, densifying said starting materials, using suitable means and apparatus, d, heating said starting materials, using suitable means and apparatus, and wherein said halogenated carbon nanoparticles are partially or completely dehalogenated by thermal decomposition reactions, causing SP3 carbon-carbon covalent bond formation between adjacent partially or completely dehalogenated carbon nanoparticles, wherein the steps c and d can be performed as two separate steps or as a single step.

11. A method of claim 10 comprising, a, additive manufacturing apparatus comprising a controller for placing starting materials, densifying apparatus, and sintering apparatus, in combination with suitable means and apparatus for toxic fume removal is used to densify halogenated carbon nanoparticles, b, selective laser sintering, ion beam sintering, and electron beam sintering are used to cause thermal decomposition dehalogenation reactions between adjacent said halogenated carbon nanoparticles, to cause formation of covalent bonds between adjacent halogenated nanoparticles, c, prototyped green bodies comprising densified, halogenated nanoparticles are processed further outside the additive manufacturing apparatus, using suitable means and apparatus for adding energy to cause dehalogenation reactions and formation of covalent bonds between adjacent halogenated nanoparticles.

12. A method of claim 1 wherein, means and apparatus for densifying nanoparticles in starting materials is selected from the group consisting of, cold pressing, hot pressing, hot isostatic compression, cold isostatic compression, spark plasma sintering, capacitor discharge sintering, vacuum assisted assembly, electrodeposition, electrophoretic deposition, spray deposition, supersonic spray deposition, ultrasonic spray deposition, cold roller pressing, hot roller pressing, evaporation, frit compression, electrostatic deposition, fiber extrusion, solution spinning, and fiber drawing.

13. A method of claim 1 comprising, a, providing starting materials selected from the group consisting of,
  i, halogenated carbon nanoparticles,
  ii, carbon nanoparticles in combination with carbide-forming nanoparticles, b, providing additive manufacturing apparatus comprising a controller for placement of starting materials, densifying apparatus and sintering apparatus, wherein densifying means are selected from the group consisting of supersonic spray deposition, ultrasonic spray deposition, ink jets, fiber extrusion and roller pressing, c, adding energy for causing covalent bonding of said nanoparticles with adjacent nanoparticles by means selected from the group consisting of laser sintering, ion beam sintering, and electron beam sintering, d, wherein when the starting material is selected as halogenated carbon nanoparticles, a means and apparatus for removing toxic fumes resulting from decomposition of halogenated carbon nanoparticles is provided or, e, alternatively, prototyped green bodies fabricated by said additive manufacturing apparatus of step b are further processed outside said additive manufacturing apparatus with suitable means and apparatus for adding energy to cause formation of covalent bonds between adjacent nanoparticles.

14. A method of claim 1, wherein energy to promote formation of covalent bonds between adjacent nanoparticles in a starting material, is provided to said starting material by suitable means and apparatus selected from the group consisting of laser beams, ion beams, electron beams, induction heating, microwave heating, hot pressing, hot isostatic pressing, supersonic spray deposition, spark plasma synthesis, capacitive discharge sintering, direct electric currents, pulsed current, and alternating electric currents.

15. A method of claim 1 comprising, a, supersonic spray deposition using suitable means and apparatus is used to simultaneously densify, and to add kinetic energy to starting materials to cause formation of covalent bonds between adjacent nanoparticles in a starting material, b, said starting material comprising nanoparticles are selected from the group consisting of,
  i, halogenated carbon nanoparticles,
  ii, fluorinated graphene nanosheets,
  iii, fluorinated carbon nanotubes,
  iv, double walled carbon nanotubes,
  v, double walled carbon nanotubes in combination with boron, vi, combinations of carbon nanoparticles mixed with carbide-forming nanoparticles wherein the carbon nanoparticles are selected from the group consisting of graphene quantum dots, graphene nanoribbons, reduced graphene oxide, fullerenes, endohedral fullerenes, and nested fullerenes.

16. A method of claim 1 comprising,
a, providing a starting material, consisting of carbon nanoparticles consisting of multiwalled carbon nanotubes and carbide-forming nanoparticles consisting of magnesium diboride nanoparticles,
b, mixing said starting material, using suitable means and apparatus,
c, compressing said starting material using suitable means and apparatus to form a powder with spaces between adjacent nanoparticles having substantially the same width as said carbon nanotubes,
d, infiltrating said material with a carbide-forming element comprising trichlorosilane gas or liquid using suitable means and apparatus,
e, further densifying said material and collecting excess trichlorosilane,
f, heating said material infiltrated with said trichlorosilane to above the temperature of decomposition of said trichlorosilane in a hot press to form a material comprising silicon nanoparticles, magnesium diboride nanoparticles and multiwalled carbon nanotubes,
g, removing the chlorine gas decomposition product, using suitable means and apparatus,
h, further densifying and heating said material in a hot press, to a temperature of 1700° C.-1800° C. for a period ranging from one to two hours to cause formation of covalent bonds between adjacent silicon nanoparticles, boron nanoparticles and multiwalled carbon nanotubes to cause formation of covalent bonds between adjacent silicon nanoparticles, boron nanoparticles and multiwalled carbon nanotubes,
i, further densifying and heating said material in a spark plasma synthesis apparatus to a temperature of 1700° C.-1800° C. to cause formation of covalent bonds between adjacent silicon nanoparticles, boron nanoparticles and multiwalled carbon nanotubes wherein steps h and i can be used in the alternative or in combination with each other.

17. A method of claim 1 comprising,
a, providing a carbon nanoparticle starting material and providing a carbide forming nanoparticle starting material, wherein the smallest dimension of said carbon nanoparticles is substantially the same size as the smallest dimension of said carbide forming nanoparticles,
b, using suitable densifying means and apparatus to provide a carbon nanoparticle starting material that has spaces between adjacent carbon nanoparticles with substantially the same size as the smallest dimension of said carbon nanoparticles,
c, providing a carbide forming nanoparticle starting material wherein carbide forming nanoparticles are formed from infiltrating carbide-forming elements supplied in liquid and in gaseous phase into the spaces between adjacent carbon nanoparticles, using suitable means and apparatus,
d, said carbide forming nanoparticle starting materials in combination with said carbon nanoparticle starting materials are densifed using suitable means and apparatus,
e, energy to promote formation of covalent bonds between adjacent carbide forming nanoparticles and carbon nanoparticles in a starting material, is provided by suitable means and apparatus selected from the group consisting of laser beams, ion beams, electron beams, induction heating, microwave heating, hot pressing, hot isostatic pressing, supersonic spray deposition, spark plasma synthesis and capacitive discharge sintering, wherein the steps d and e can be performed as two separate steps or as a single step.

18. A method of manufacturing bulk objects consisting of nanoparticles comprising,
a, providing a starting material comprising nanoparticles selected from the group consisting of,
i, double walled carbon nanotubes,
ii, double walled carbon nanotubes in combination with boron,
iii, single walled carbon nanotubes,
iv, multi-walled carbon nanotubes,
v, nested fullerenes,
vi, endohedral fullerenes,
vii, fullerenes,
viii graphene,
ix, other species of carbon nanoparticles,
b, said starting material being free from binders, polymers, organic polymers, polymer binders and polymer matrixes,
c, mixing said starting materials using suitable means and apparatus,
d, additive manufacturing apparatus comprising a controller for placing starting materials and densifying apparatus in combination with sintering apparatus is used to densify said starting materials,
e, further using said additive manufacturing apparatus for electron beam sintering, laser beam sintering, and ion beam sintering said starting materials in a vacuum or inert atmosphere, to cause covalent bond formation between adjacent nanoparticles in starting materials, wherein said object is comprised of nanoparticles that substantially retain their size, shape and graphitic wall structure after densification and addition of energy.

19. A method of manufacturing bulk objects consisting of nanoparticles comprising,
a, providing an electrically conductive nanoparticle starting material, selected from the group consisting of,
i, double walled carbon nanotubes,
ii, double walled carbon nanotubes in combination with boron,
iii, single walled carbon nanotubes,
iv, multi-walled carbon nanotubes,
v, nested fullerenes,
vi, endohedral fullerenes
vii, fullerenes,
viii, graphene,
ix, other species of carbon nanoparticles,
x, carbon nanoparticles in combination with carbide forming nanoparticles,
b, said starting material being free from binders, polymers, organic polymers, polymer binders and polymer matrixes,
c, mixing said starting materials using suitable means and apparatus,
d, forming said starting material into nanopaper by suitable means and apparatus, e, providing a roll to roll apparatus comprising:
- i, two rollers holding said nanopaper,
- ii, two electrified roller-electrodes placed above and below said nanopaper and contacting and compressing said nanopaper placed between them, said electrodes connected to a direct current power source wherein said roller electrodes have opposite electrical signs, or said electrodes are connected to alternating current power source or a power source supplying shaped pulses,
- iii, two electrified roller-electrodes placed adjacent to each other wherein said film or nanopaper is contacting said roller-electrodes, said roller electrodes are connected to a direct current power source wherein said roller electrodes have opposite electrical signs, or said electrodes are connected to an alternating current power source or a power source supplying shaped pulses, f, wherein said roll to roll apparatus is used to densify the starting material and pass an electric current through said nanopaper, providing electrical and thermal energy for causing formation of covalent bonds between adjacent nanoparticles in said nanopaper.

* * * * *